United States Patent
Kameyama et al.

(10) Patent No.: US 10,701,188 B2
(45) Date of Patent: Jun. 30, 2020

(54) TRANSFER DEVICE, COMMUNICATION SYSTEM AND COMMUNICATION METHOD

(71) Applicant: FUJITSU LIMITED, Kawasaki-shi, Kanagawa (JP)

(72) Inventors: Hiroaki Kameyama, Kawasaki (JP); Shinichi Sazawa, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 15/801,815

(22) Filed: Nov. 2, 2017

(65) Prior Publication Data

US 2018/0146073 A1 May 24, 2018

Related U.S. Application Data

(63) Continuation of application No. PCT/JP2015/063501, filed on May 11, 2015.

(51) Int. Cl.
*H04L 29/06* (2006.01)
*H04L 29/08* (2006.01)
*H04L 12/741* (2013.01)

(52) U.S. Cl.
CPC .............. *H04L 69/16* (2013.01); *H04L 29/08* (2013.01); *H04L 45/74* (2013.01)

(58) Field of Classification Search
CPC ................................ H04L 29/08; H04L 69/16
See application file for complete search history.

(56) References Cited

U.S. PATENT DOCUMENTS

| | | | |
|---|---|---|---|
| 2011/0040992 A1* | 2/2011 | Mizunashi | H04L 12/10 713/310 |
| 2014/0079076 A1* | 3/2014 | Kamble | H04L 49/9057 370/474 |

(Continued)

FOREIGN PATENT DOCUMENTS

| | | |
|---|---|---|
| JP | 9-331366 | 12/1997 |
| JP | 2002-368623 | 12/2002 |
| JP | 2015-82296 | 4/2015 |

OTHER PUBLICATIONS

Pavithra, IP Packet Fragmentation and Reassembly at Intermediate Routers, International Journal of Computer Sciences and Engineering, V-2, I-4, Apr. 2014.*

(Continued)

*Primary Examiner* — Zhensheng Zhang
(74) *Attorney, Agent, or Firm* — Staas & Halsey LLP

(57) ABSTRACT

A device includes a transmission/reception unit configured to receive a packet transmitted from a communication device to a destination device, a control unit configured to separate data received through the packet into transmission data and control information, a replacement process unit configured to generate replacement data resulting from replacing data associated with an identifier with the identifier in the transmission data when data that has been transmitted toward the destination device in association with the identifier is included, and a transmission unit configured to transfer the replacement data toward the destination device, wherein the control unit generates connected data resulting from connecting respective pieces of data obtained by removing the control information from the data, and discards the control information, and the replacement process unit generates the replacement data by replacing data associated with the identifier with the identifier in the connected data.

8 Claims, 19 Drawing Sheets

(56) References Cited

U.S. PATENT DOCUMENTS

2014/0172795 A1 6/2014 Teng
2014/0188822 A1 7/2014 Das
2015/0120666 A1 4/2015 Otsuka

OTHER PUBLICATIONS

International Search Report dated Jun. 30, 2015 in corresponding International Patent Application No. PCT/JP2015/063501.
Written Opinion of the International Search Authority dated Jun. 30, 2015 in corresponding International Patent Application No. PCT/JP2015/063501.

* cited by examiner

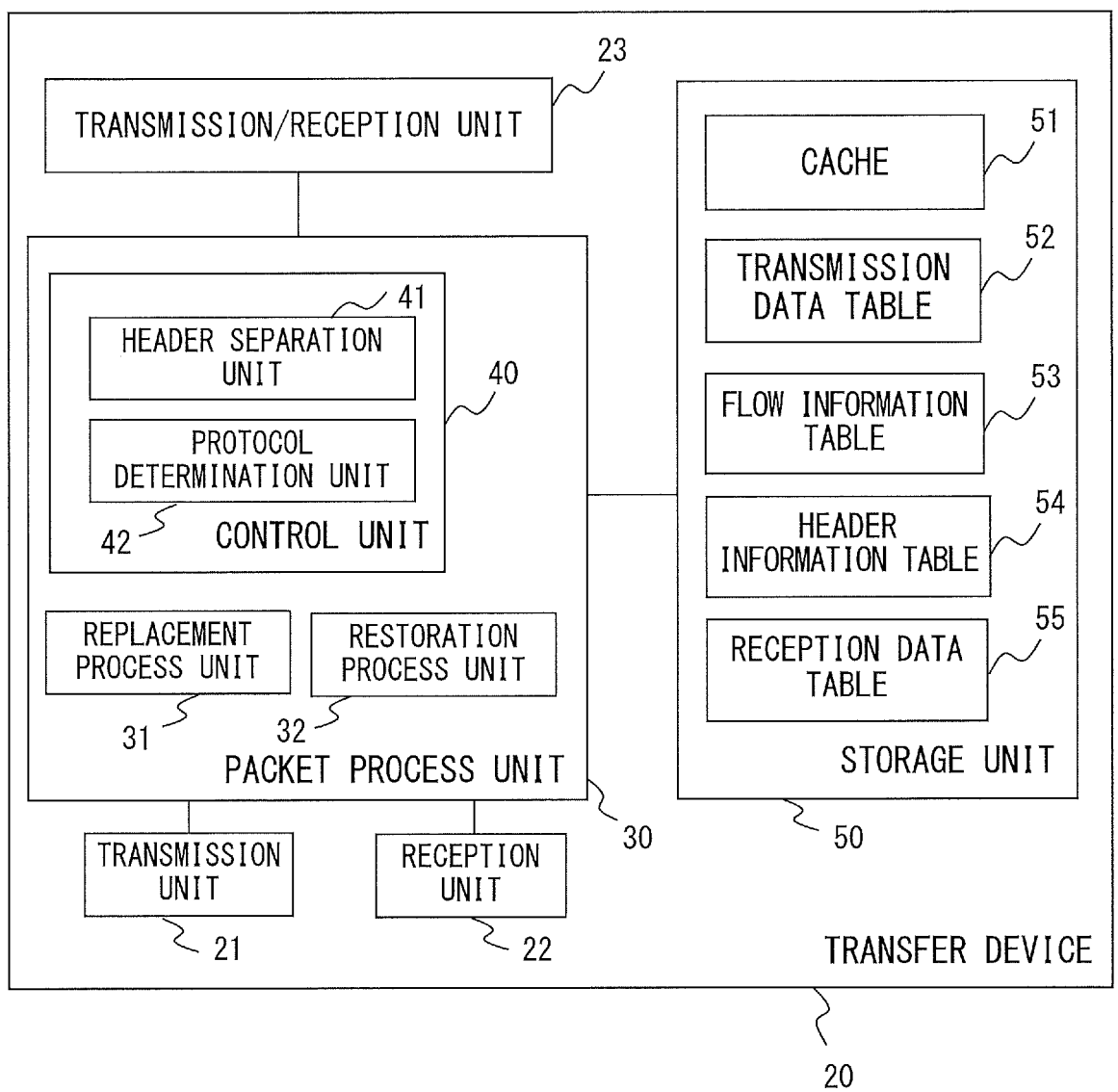
F I G. 3

| FLOW | APPLICATION TYPE |
|---|---|
| IPA → IPB | CIFS |
| IPC → IPD | HTTP |

FIG. 6

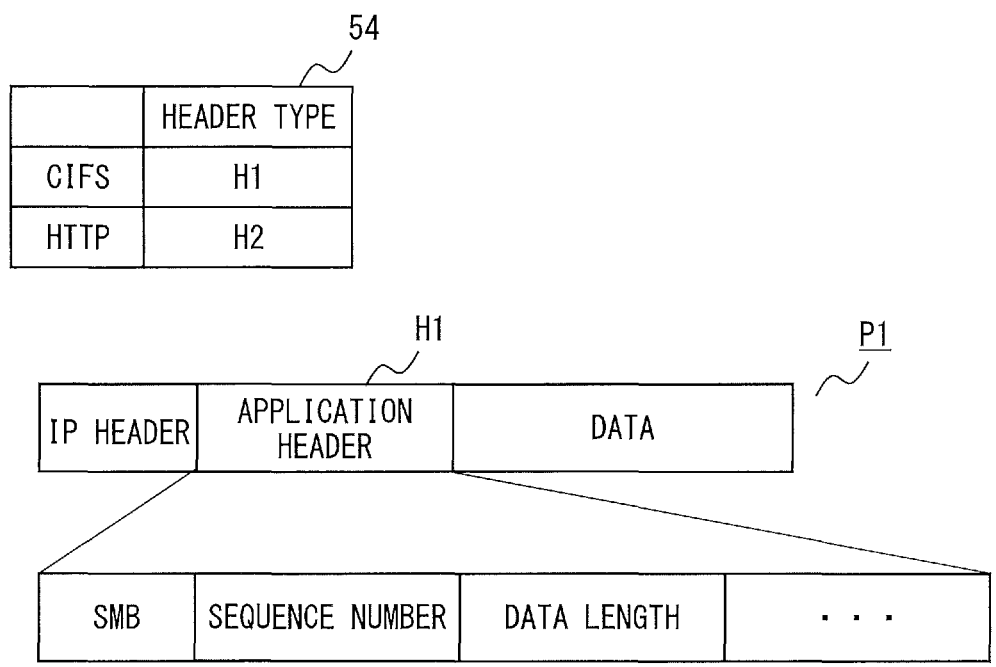
F I G. 7

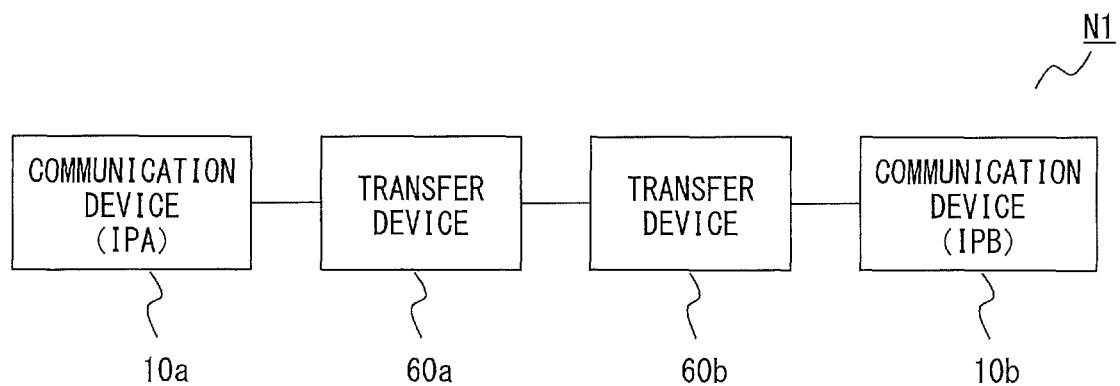
F I G. 1 1

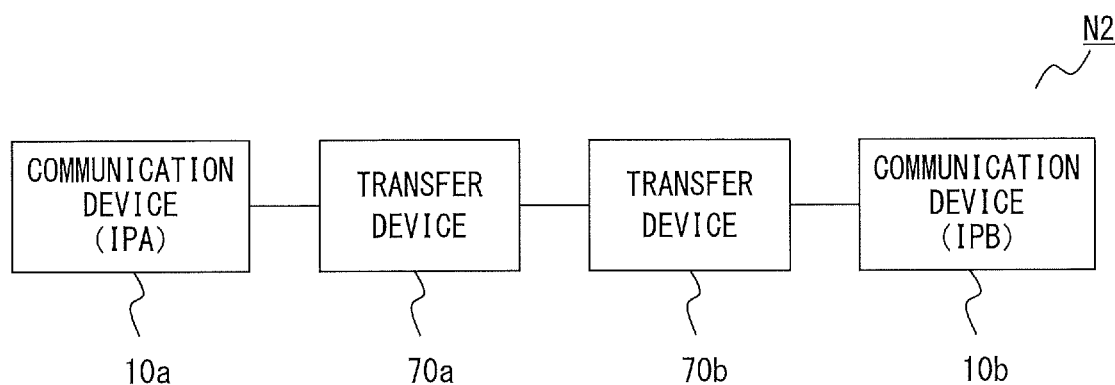
F I G. 1 6

TRANSFER DEVICE, COMMUNICATION SYSTEM AND COMMUNICATION METHOD

CROSS-REFERENCE TO RELATED APPLICATION

This application is a continuation application of International Application PCT/JP2015/063501 filed on May 11, 2015 and designated the U.S., the entire contents of which are incorporated herein by reference.

FIELD

The embodiments discussed herein are related to communications conducted between a plurality of devices.

BACKGROUND

In recent years, there has been a demand for higher speeds in communications, and various attempts have been made to achieve higher speeds in communications. In order to reduce amounts of data in transmissions, for example, deduplication is performed on data that is a transmission target in some cases. In deduplication, a communication device on the reception side stores, in association with an identifier, data that it received from the communication device on the transmission side in the past, and the communication device on the transmission side also stores data that it transmitted in the past and the identifier in association with each other. The communication device on the transmission side determines whether or not part or all of the data as the transmission target is data that it has already transmitted, and for data that it has already transmitted, the communication device on the transmission side transmits, to the communication device on the reception side, the identifier that is associated with that data. The communication device on the reception side reads the data that is stored in association with the received identifier, and treats the read data as data transmitted from the communication device on the transmission side.

FIG. 1 explains an example of a transfer process in a case when deduplication is performed. When for example data d1 is transmitted, the communication device on the transmission side partitions transmission data into a plurality of pieces of data, and determines data that was transmitted in the past and data that is included a plurality of times in transmission data. In the example illustrated in FIG. 1, data d1, which is transmission data, includes data d2 and data d3 in an order of data d2, data d3, data d3 and data d2. Also, it is assumed that the communication device on the transmission side has transmitted neither data d2 nor data d3 to the communication device on the reception side. In such a case, the communication device on the transmission side transmits identification information ida that represents data d2 to the communication device on the reception side together with first data d2 in the transmission data. The communication device on the reception side stores data d2 and identification information ida in association with each other. In FIG. 1, identification information ida is denoted by A to facilitate understanding. Similarly, the communication device on the transmission side transmits identification information idb that represents data d3 to the communication device on the reception side together with data d3 in the transmission data. In FIG. 1, identification information idb is denoted by B. The communication device on the reception side stores data d3 and identification information idb in association with each other.

Next, the communication device on the transmission side transmits identifier idb (B) that represents data d3 to the communication device on the reception side instead of data d3 that follows in the transmission data. When receiving identification information idb, the communication device on the reception side determines data d3 stored in association with identification information idb, and reads data d3 in place of the reception data. Similarly, the communication device on the transmission side transmits identifier ida (A) that represents data d2 to the communication device on the reception side instead of data d2 that follows in the transmission data. When receiving identification information ida, the communication device on the reception side determines data d2 stored in association with identification information ida, and reads data d2 in place of the reception data. Thus, after transmitting data d2 and data d3 one time, just by transmitting the identification information of these pieces of data, the communication device on the transmission side can achieve the same effect as that achieved when data d2, data d3, data d3 and data d2 are transmitted to the communication device on the reception side. The communication device on the reception side restores data d1 by connecting data d2, data d3, data d3 and data d2.

As a related technique, a device has been suggested that assigns a pattern number to a pattern having a high appearance ratio to store it, and generates transfer data by replacing a pattern in data with its pattern number when the pattern included in data corresponds to a stored pattern (Patent Document 1 for example). The transmission device transfers, to the device on the reception side, information of transfer data and a pattern registered in a pattern dictionary. Further, a transfer method is known in which data to which a value indicating that a device on the data transmission side is performing conversion identification is added is transferred when the value of one byte of data that is a transmission target is a value used for a control signal. In this transfer method, data is not changed for values in a prescribed range that is different from control information (Patent Document 2 for example).

Patent Document 1: Japanese Laid-open Patent Publication No. 2002-368623

Patent Document 2: Japanese Laid-open Patent Publication No. H9-331366

SUMMARY

According to an aspect of the embodiments, a transfer device includes a transmission/reception unit configured to receive a packet transmitted from a communication device to a destination device, a control unit configured to separate data received through the packet into transmission data to be transmitted by the communication device to the destination device and control information generated by an application that performs a transmission process of the transmission data in the communication device, a replacement process unit configured to generate replacement data resulting from replacing data associated with an identifier with the identifier in the transmission data when data that has been transmitted toward the destination device in association with the identifier is included in the transmission data, and a transmission unit configured to transfer the replacement data toward the destination device instead of the transmission data, wherein the control unit generates connected data resulting from connecting, in an order starting from a piece closest to a head of the packet, respective pieces of data obtained by removing the control information from the data received through the packet, and discards the control information, and the replacement process unit generates the replacement data by replacing data associated with the identifier with the identifier in the connected data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 explains an example of a configuration of a transfer device;

FIG. 6 explains an example of a flow information table;

FIG. 7 explains examples of a header information table and an application header;

FIG. 11 explains an example of a flow information table according to the second embodiment;

FIG. 16 illustrates an example of a flow information table according to the third embodiment;

DESCRIPTION OF EMBODIMENTS

When for example duplication is removed in transmission data, a device on the transmission side partitions the transmission data into pieces having a prescribed data length, and determines whether or not each one is data that has been transmitted before. In the above, depending upon applications that perform a transfer process of data, data as a transfer target sometimes receives modifications such as insertion of an application header, etc. In such a case, modifications performed by an application that performs a transfer process reduce the data amount that can be removed as duplicate data, deteriorating the transfer efficiency.

Thus, it is desired that a technique that can improve the efficiency in data transfer be provided.

Figure 1:
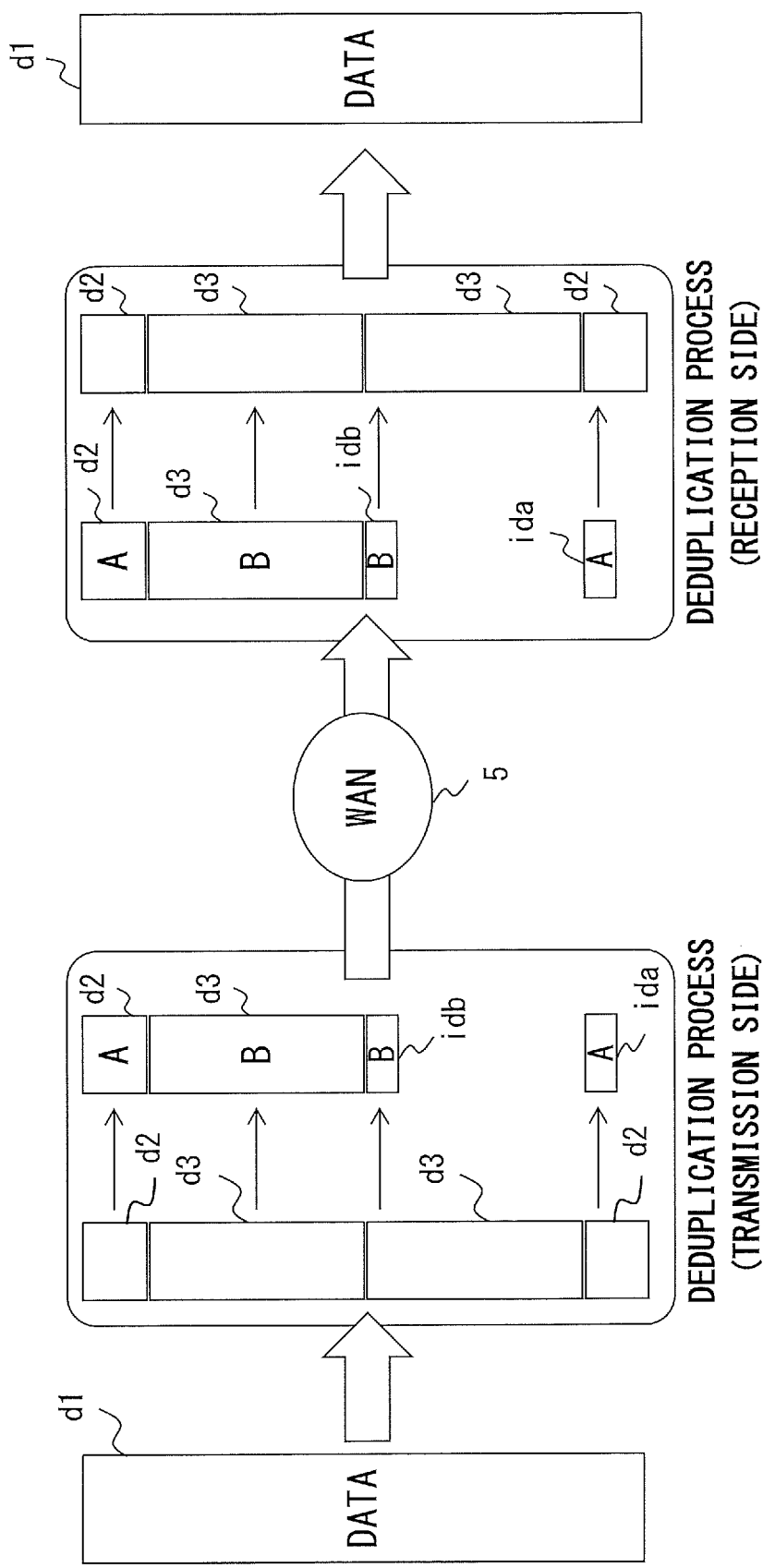
FIG. 1 explains an example of a transfer process in a case when deduplication is performed.
Figure 2:
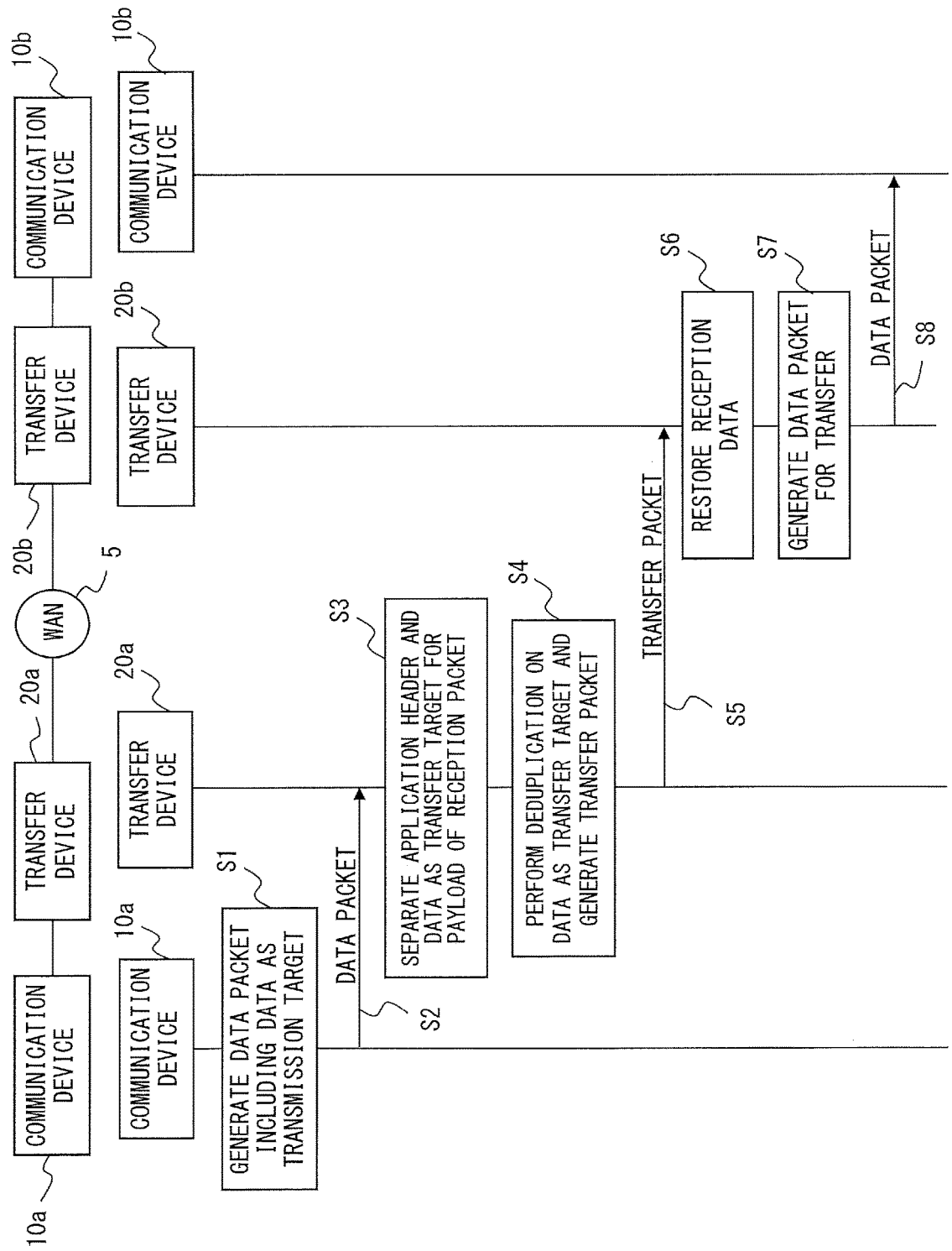
FIG. 2 explains an example of a method according to an embodiment.

FIG. 2 explains an example of a method according to an embodiment. FIG. 2 illustrates an example of a network in which a communication device 10a and a communication device 10b perform communications via a transfer device 20a and a transfer device 20b, and also illustrates an example of a process that is performed in each device in the network. It is assumed that the transfer device 20a and the transfer device 20b are both devices that can perform deduplication and restoration of data transmitted by using deduplication. Also, the transfer device 20a and the transfer device 20b are communicating via a Wide Area Network (WAN).

In step S1, the communication device 10a generates a data packet including data that is a transmission target (transmission data) to the communication device 10b. It is assumed then that an application operating in the communication device 10a adds an application header to the transmission data to be transmitted to the communication device 10b and includes the transmission data in a data packet. Note that the number of application headers included in transmission data, an interval at which application headers are inserted, and other factors are determined in accordance with implementation. Also, when a plurality of application headers are inserted into transmission data, the plurality of application headers each include different information.

In step S2, the communication device 10a transmits the data packet including the transmission data toward the communication device 10b. Note that while transmission of a data packet and a transfer packet is represented by one arrow to facilitate understanding in FIG. 2, arbitrary numbers of data packets and transfer packets may be transmitted or received between respective devices.

In step S3, the transfer device 20a receives the data packet and extracts the payload of the data packet. The transfer device 20a performs, on the data in the payload, a process of separating the application header and the transmission data from each other. It is assumed that the transfer device 20a has in advance stored a candidate for an application header that may be included in a data packet. The transfer device 20a performs deduplication on the transmission data determined in step S3 and generates a transfer packet (step S4). The transfer device 20a transfers the transfer packet to the transfer device 20b (step S5). It is assumed that the transfer device 20a has in advance stored the fact that the transfer destination for the data addressed to the communication device 10b is the transfer device 20b. Through the processes in step S4 and step S5, a portion of data to be transferred and identification information to be replaced with data are transmitted to the transfer device 20b by the transfer packet.

When receiving the transfer packet, the transfer device 20b stores data and identification information in the transfer packet as appropriate. Then, the transfer device 20b stores identification information in association with the data associated with that identification information. The transfer device 20b uses the data and identification information received by using the transfer packet, and restores the transmitted data (step S6). The transfer device 20b generates a data packet for transferring the data after the restoration to the communication device 10b (step S7). The transfer device 20b also performs a process related to an application header as appropriate in step S7. The transfer device 20b transfers the generated data packet to the communication device 10b (step S8). The communication device 10b receives the data packet so as to obtain the data that is a transmission target transmitted from the communication device 10a.

In a method according to an embodiment, as explained by referring to step S3 and step S4, deduplication is performed for data resulting from removing an application header from the data in the payload of a data packet. Accordingly, transfer device 20 can prevent deduplication efficiency from being deteriorated due to a difference between pieces of information in application headers inserted into transmission data.

First Embodiment

FIG. 3 explains an example of a configuration of the transfer device 20 according to the first embodiment. The transfer device 20 includes a transmission unit 21, a reception unit 22, a transmission-reception unit 23, a packet process unit 30 and a storage unit 50. The packet process unit 30 includes a replacement process unit 31, a restoration process unit 32 and a control unit 40. Further, the control unit 40 includes a header separation unit 41 and a protocol determination unit 42. The storage unit 50 operates as a cache 51, and further stores a transmission data table 52, a flow information table 53, a header information table 54 and a reception data table 55.

The transmission unit 21 transmits a packet to a different transfer device 20 included in a WAN 5. The transmission unit 21 outputs, to the restoration process unit 32, data received from a different transfer device 20 included in the WAN 5. The transmission-reception unit 23 transmits and receives packets with a communication device 10 not included in the WAN 5. The transmission-reception unit 23 outputs a data packet received from the communication device 10 to the protocol determination unit 42.

The protocol determination unit 42 determines an application protocol that the communication device 10 used for generating the data packet. The header separation unit 41 identifies an application header from data received from the communication device 10 and outputs the application header to the replacement process unit 31 so that the application header and the transmission data that the communication device 10 is going to transmit to the communication destination can be distinguished from each other. The header separation unit 41 uses the header information table 54 as appropriate when determining an application header. The header information table 54 associates a transfer application that can be used for a transfer process, format information of the application header, etc. with each other. An example of the header information table 54 will be explained later.

The replacement process unit 31 performs a deduplication process of input data by using the transmission data table 52. In the above, an application header is input to the replacement process unit 31 separately from transmission data. Also, the transmission data table 52 associates data transmitted to a different transfer device 20 and the identifier reported in association with that data. Then, the replacement process unit 31 replaces, with an identifier, data included in the transmission data table 52 from among the transmission data, and performs a deduplication process. When obtaining, through the reception unit 22, data that received a deduplication process, the restoration process unit 32 generates restoration data by using the reception data table 55 as appropriate. Note that the reception data table 55 stores data received from a different transfer device 20, together with an identifier for which an association relationship with that data was reported. The flow information table 53 stores an application protocol used for a process of a flow in association with information that can identify that flow. As information that can identify a flow, a combination between a transmission source address and destination address of data for example may be used. Cache 51 is used for storing data as appropriate.

Figure 4:
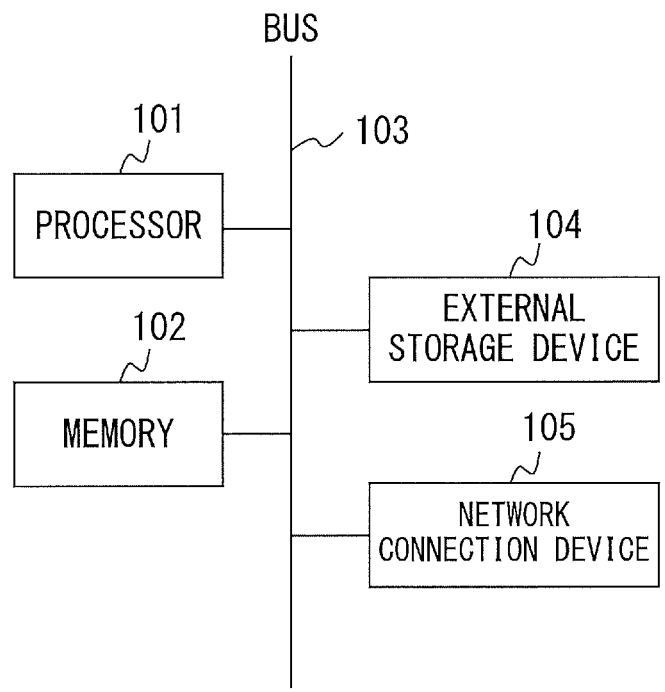
FIG. 4 explains an example of a hardware configuration of the transfer device.

FIG. 4 explains an example of a hardware configuration of the transfer device 20. The transfer device 20 includes a processor 101, a memory 102, a bus 103, an external storage device 104, and a network connection device 105. The transfer device 20 may be implemented by for example a computer etc.

The processor may be an arbitrary process circuit including a Central Processing Unit (CPU). The processor 101 operates as the packet process unit 30. Note that the processor 101 may execute for example a program stored in the external storage device 104. The memory 102 and the external storage device 104 operate as the storage unit 50. Further, the memory 102 also stores data obtained through the operation of the processor 101 and data used for processes of the processor 101 as appropriate. The network connection device 105 is used for communications with a different device, and operates as the transmission unit 21, the reception unit 22 and the transmission-reception unit 23.

Figure 5:
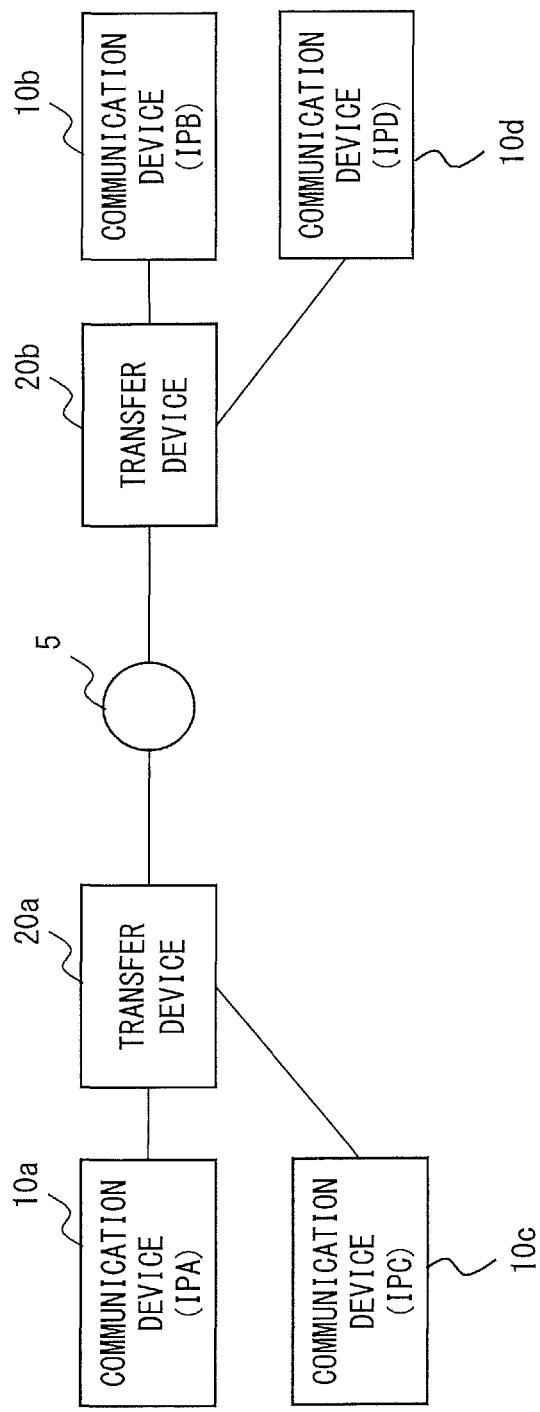
FIG. 5 explains an example of a network in which a transfer process is performed.

FIG. 5 explains an example of a network in which a transfer process is performed. FIG. 5 illustrates an example of a network in a case when the transfer device 20a and the transfer device 20b perform communications having the WAN 5 between them. According to the destination, the transfer device 20a transfers a packet received from the communication device 10a or the communication device 10c. According to the destination, the transfer device 20b transfers a packet received from the communication device 10b or the communication device 10d. The communication device 10a and the communication device 10c access the WAN 5 via the transfer device 20a, and the communication device 10b and the communication device 10d access the WAN 5 via the transfer device 20b. It is assumed in this example that the transfer device 20a and the transfer device 20b operate as devices for increasing the speed of a WAN. Also, FIG. 5 illustrates an example of a network, and for example an arbitrary number of the communication devices 10 are connected to each transfer device 20. In the example illustrated in FIG. 5, the communication device 10a is performing communications using an address of IPA. Similarly, the communication devices 10b, 10c and 10d are performing communications respectively using IPB, IPC and IPD.

Hereinafter, explanations will be given for an example of a process performed in each device by using an example of a transfer process that is performed in a case when the communication device 10a transmits data to the communication device 10b via the transfer device 20a and the transfer device 20b. In the following example, it is assumed that data transmission from the communication device 10a to the communication device 10b is performed by using CIFS (Common Internet File System). It is also assumed that the communication device 10a has in advance stored the fact that a packet addressed to the communication device 10b is to be transferred to the transfer device 20a. Also, in the explanations below, in order to facilitate finding which of the devices is being referred to in an explanation for an operation, the character following the numerical symbol of the transfer device 20 to which the device being referred to belongs may be added to the numerical symbol of that device that is being referred to. For example, the transmission-reception unit 23a is the transmission-reception unit 23 included in the transfer device 20a.

When the communication device 10a transmits transmission data such as a file to the communication device 10b, an application header of CIFS is inserted into the transmission data through a process in the communication device 10a. The communication device 10a transmits the transmission data into which the application header has been inserted, to the transfer device 20a by using a data packet. Note that an arbitrary number of data packets are used for transmitting transmission data into which an application header has been inserted. Also, the payload of each data packet may include part of an application header or does not have to include even part of an application header. Further, the payload of a data packet may include one or more application headers. Note that the transmission source address and the destination address of a data packet including data transmitted from the communication device 10a to the communication device 10b are set to be IPA and IPB, respectively.

The transfer device 20a receives via the transmission-reception unit 23a a data packet, addressed to the communication device 10b, that has been transmitted from the communication device 10a. Transmission-reception unit 23a outputs the data packet to the protocol determination unit 42a. The protocol determination unit 42a searches the flow information table 53a by using a combination between the transmission source and a destination of the input data packet as a key.

FIG. 6 explains an example of the flow information table 53. It is assumed that information in the flow information table 53 has been stored in advance in the external storage device 104 or the memory 102 of the transfer device 20. In the example of FIG. 6, the flow having IPA (the communication device 10a) as the transmission source address and IPB (the communication device 10b) as the destination address is performing a communication that uses CIFS. The flow having IPC (the communication device 10c) as the transmission source address and IPD (the communication device 10d) as the destination address is performing a communication that uses HTTP (Hypertext Transfer Protocol).

The protocol determination unit 42a uses the flow information table 53 illustrated in FIG. 6 to determine that the data packet having IPA and IPB respectively as the transmission source address and destination address has been processed by CIFS. The protocol determination unit 42a outputs, to the header separation unit 41a, the payload in the data packet together with the determination result. The header separation unit 41a refers to the header information table 54 so as to process packets.

FIG. 7 explains examples of the header information table 54 and an application header. The header information table 54 associates an application that may be used for transmission and reception of a file and the type of an application header used in each application. It is recorded in the header information table 54 that when CIFS is used for a transfer process, header H1 is used as an application header. Further, header information table 54 associates formats of application headers for each type of an application header. For example, an example of a format of header H1 associated with CIFS is illustrated in the packet format illustrated as P1 of FIG. 7. When CIFS is used for a transfer process, a packet includes an IP header, application header H1 and data. Header H1 includes a character string (SMB) used for determining the application header, a sequence number and a data length. The sequence number is information used for determining the position occupied by the data following the application header in the data as the transmission target. The data length is the length of data that follows the application header. The header separation unit 41a uses the determination result in the protocol determination unit 42a and the header information table 54 to separate the application header from data in the payload of the packet.

Figure 8:
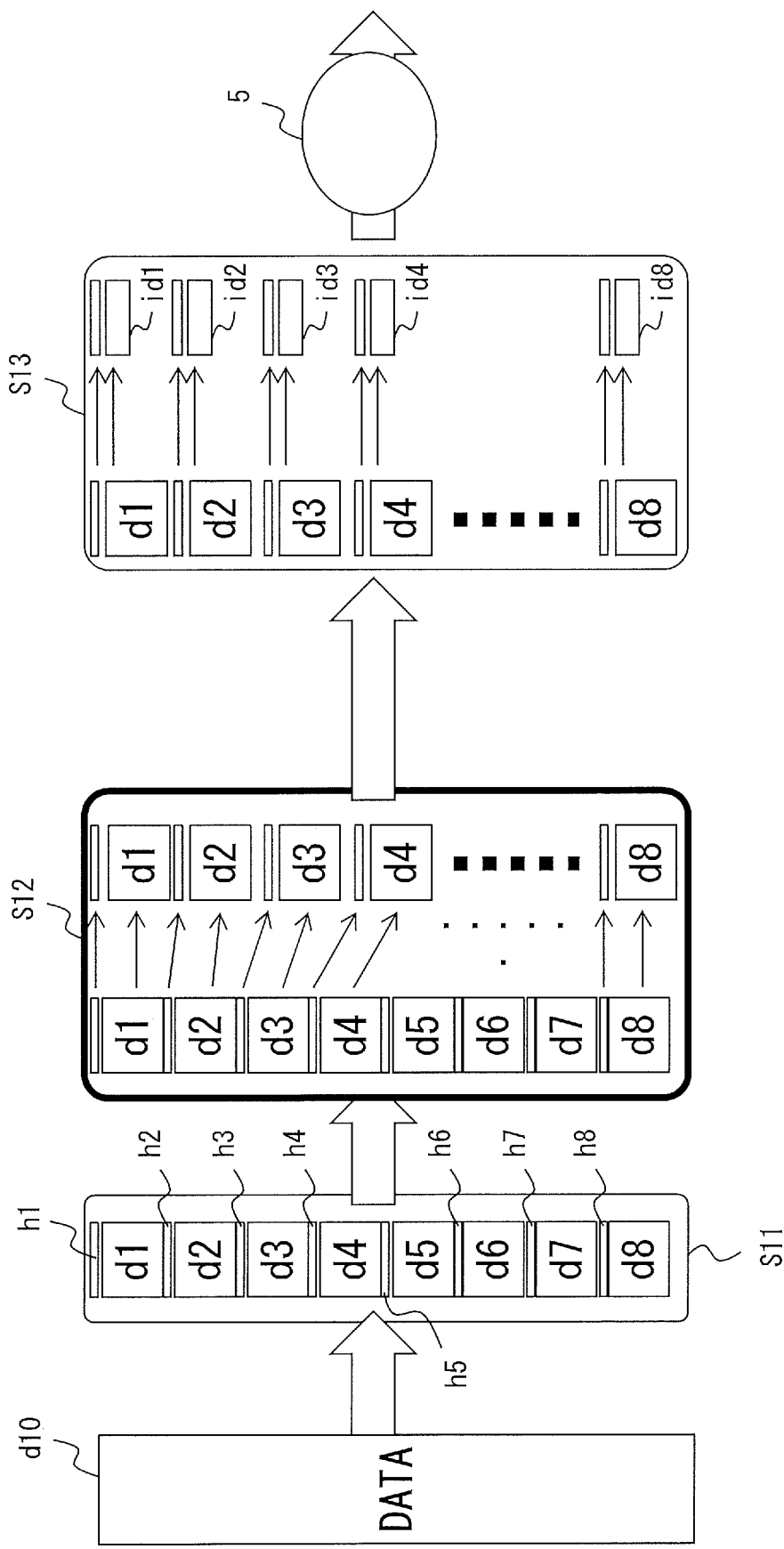
FIG. 8 explains an example of a transfer process according to the first embodiment.

FIG. 8 explains an example of a transfer process according to the first embodiment. By referring to FIG. 8, specific explanations will be given for an example of a process by using an example where the communication device 10a transmits data d10 of FIG. 8 to the communication device 10b.

Step S11 illustrates an example of a transmission process of data d10 in the communication device 10a. In the example of FIG. 8, the communication device 10a transmits data d10 to the communication device 10b separately in 8 pieces of data, i.e., data d1 through data d8. Hereinafter, in order to distinguish data d1 through data d8 from data d10, data d1 through data d8 may be referred to as divisional data in some cases. The communication device 10a adds application headers (h1 through h8) to the individual pieces of divisional data. Thus, as illustrated in step S11, data transmitted from the communication device 10a includes application headers and pieces of divisional data alternately.

Step S12 illustrates an example of a process of the header separation unit 41a in the transfer device 20. To the header separation unit 41a, as illustrated on the left side of step S12, application headers and pieces of data have been input as pieces of alternating consecutive data. Also, the header separation unit 41a has obtained information in the payload of the packet addressed to the communication device 10b in the procedures explained by referring to FIG. 6 or other figures.

First, header separation unit 41a determines the head position of each application header. As illustrated in FIG. 7, the communication device 10a uses CIFS, and the head of an application header used in CIFS includes a specific character string (SBM). Then, header separation unit 41a determines the head of an application header by using the specific character strings. The header separation unit 41a reads from the head to the end of application header h1, and outputs application header h1 to the replacement process unit 31a. Thereafter, divisional data d1 included after application header h1 is output to the replacement process unit 31a separately from application header h1 and application header h2. In the above, header separation unit 41a may determine the end of divisional data d1 by using the data length explained in FIG. 7. A similar separation process is also performed on application headers h2 through h8 and divisional data d2 through d8. As a result of this, the header separation unit 41a has output the application headers and pieces of divisional data to the replacement process unit 31a as separated data as illustrated on the right side of step S12. The separation between application headers and divisional data is performed by inputting the application headers and divisional data to the replacement process unit 31a in an arbitrary format in which the application headers and divisional data can be recognized as different pieces of data in the replacement process unit 31a.

Step S13 illustrates an example of a deduplication process in the replacement process unit 31a. The right side of step S13 illustrates a situation where application headers h1 through h8 and divisional data d1 through d8 are being input to the replacement process unit 31a as separated data. It is assumed in the example of FIG. 8 that the transfer device 20a transmitted pieces of the same data respectively as pieces of divisional data d1 through d8 to the transfer device 20b in the past. Meanwhile, because each application header includes a different piece of information, the transfer device 20a has not transmitted application headers h1 through h8 to the transfer device 20b before. In other words, it is assumed that transmission data table 52a includes the following information.

Identifier associated with divisional data d1: id1
Identifier associated with divisional data d2: id2
Identifier associated with divisional data d3: id3
Identifier associated with divisional data d4: id4
Identifier associated with divisional data d5: id5
Identifier associated with divisional data d6: id6
Identifier associated with divisional data d7: id7
Identifier associated with divisional data d8: id8

It is assumed in the following explanations that the reception data table 55b in the transfer device 20b also stores the identifiers of divisional data d1 through d8 in association with divisional data d1 through d8.

The replacement process unit 31a does not perform deduplication on application headers h1 through h8 that are not recorded in the transmission data table 52a, and transmits application headers h1 through h8 to the transfer device 20b. Meanwhile, for divisional data d1 through d8, the replacement process unit 31a sets the identifiers of respective pieces of the divisional data as targets to be transmitted to the transfer device 20b instead of divisional data d1 through d8. Therefore, as illustrated on the left side of step S13, data that the replacement process unit 31a sets as a target to be transmitted to the transfer device 20b is application headers h1 through h8 themselves and the identifiers (id1 through id8) of divisional data d1 through d8. The replacement process unit 31a transmits data set as a transmission target to the transfer device 20b via the transmission unit 21a.

The reception unit 22b of the transfer device 20b outputs, to the restoration process unit 32b, data received from the transfer device 20a. The restoration process unit 32b performs a restoration process by using the reception data table 55b. As described above, in the reception data table 55b, pieces of divisional data d1 through d8 are associated with the identifiers of the pieces of divisional data d1 through d8, and accordingly the transfer device 20b can restore divisional data d1 through d8 from the identifiers received from the transfer device 20a. This makes it possible for the transfer device 20b to restore data in which application headers h1 through h8 and pieces of divisional data d1 through d8 are arranged in such a manner that application headers and pieces of divisional data alternate. In other words, by a restoration process of the restoration process unit 32b of the transfer device 20b, the data illustrated on the right side of step S12 in FIG. 8 can be restored. The restoration process unit 32b transmits the restored data to the communication device 10b via the transmission-reception unit 23. This makes it possible for the communication device 10b to receive data d10.

Figure 9:
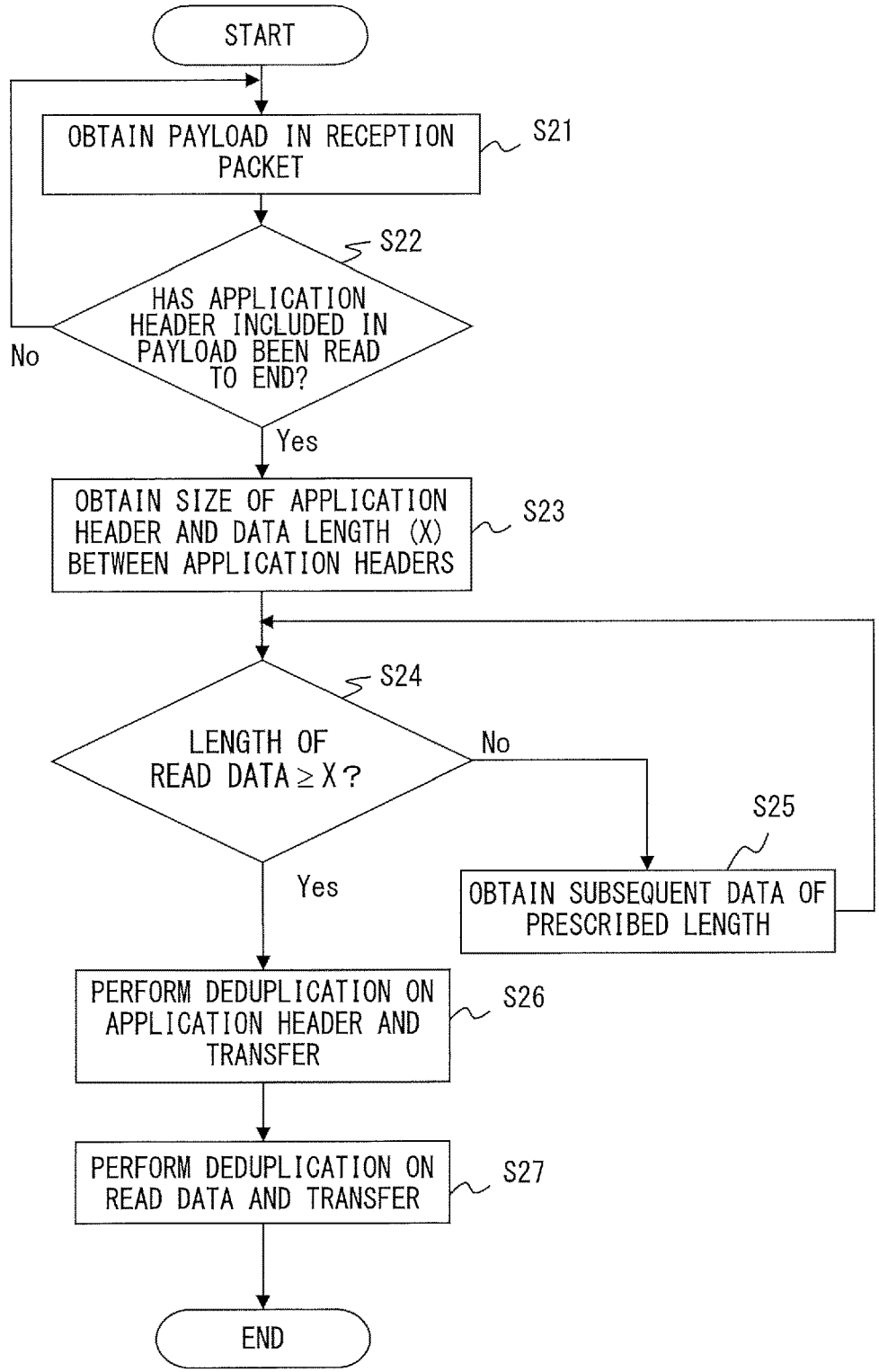
FIG. 9 is a flowchart explaining an example of a process performed in a transfer device according to the first embodiment.

FIG. 9 is a flowchart explaining an example of a process performed in the transfer device 20 according to the first embodiment. Note that while FIG. 9 illustrates a process performed when one application header and data associated with that application header are transmitted in a plurality of packets, a plurality of application headers may be included in one packet.

The header separation unit 41 of the transfer device 20 obtains the payload in the received packet (step S21). The header separation unit 41 determines whether or not the application header included in the payload has been read to the end of that application header (step S22). When the end of a payload is in the middle of an application header, the header separation unit 41 also reads the payload of the next received packet (NO in step S22). After reading an application header, the header separation unit 41 uses the flow information table 53 to obtain the size of the application header and the data length (X) between application headers (YES in step S22, step S23). The header separation unit 41 determines that the data has been read from a position that is distant from the head of the read data by the length of the application header. The header separation unit 41 determines whether or not the length of the read data is equal to or longer than the data length (X) between application headers (step S24). When the length of the read data is shorter than the data length (X) between application headers, the header separation unit 41 obtains subsequent data of a prescribed length (NO in step S24, step S25). In this example, the prescribed length is a data length obtained by subtracting the length of the read data from data length (X) between application headers. When the length of the read data is equal to or longer than data length (X) between application headers, the header separation unit 41 outputs the application header to the replacement process unit 31 (YES in step S24). The replacement process unit 31 performs a duplication process on the application header and transmits the result to the transfer destination (step S26). Next, the header separation unit 41 outputs the read data to the replacement process unit 31. The replacement process unit 31 performs deduplication on the input data and transfers the result to the transfer destination (step S27). Note that the flowchart of FIG. 9 explains an example of a process of a pair of an application header and data following that application header, and the process illustrated in FIG. 9 is repeated up to the end of the data.

As described above, the transfer device 20 according to the first embodiment separates data obtained by removing an application header from data in the payload of a data packet and the application header so as to perform deduplication. Accordingly, in the transfer device 20, even when an application header is inserted into transmission data, it is possible to prevent deduplication efficiency from being deteriorated due to a difference between pieces of information in application headers.

Second Embodiment

In the second embodiment, in order to further improve deduplication efficiency, explanations will be given for a case where an application header is not transmitted or received between transfer devices.

Figure 10:
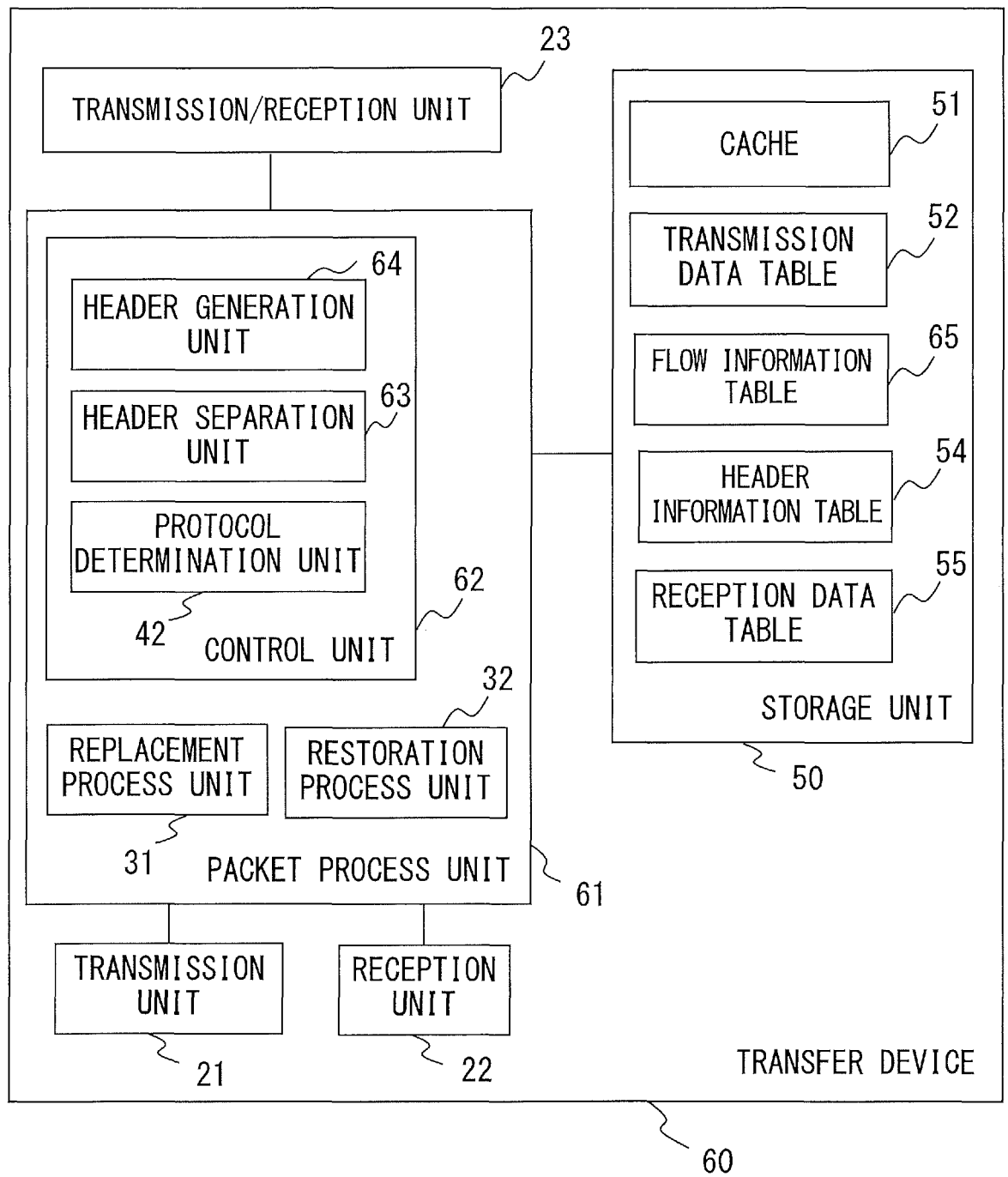
FIG. 10 explains an example of a configuration of a transfer device according to the second embodiment.

FIG. 10 explains an example of a configuration of a transfer device 60 according to the second embodiment. The transfer device 60 includes the transmission unit 21, the reception unit 22, the transmission-reception unit 23, a packet process unit 61 and the storage unit 50. The packet process unit 61 includes the replacement process unit 31, the restoration process unit 32 and a control unit 62. The control unit 62 includes the protocol determination unit 42, a header separation unit 63 and a header generation unit 64. Also, the storage unit 50 stores the cache 51, the transmission data table 52, the header information table 54, the reception data table 55 and a flow information table 65.

The header separation unit 63 operates in the transfer device 60 on the data transmission side. The header separation unit 63 obtains a received packet via the transmission-reception unit 23, and separates an application header included in the payload in the received packet and data. The procedures for separating an application header and data are similar to those in the first embodiment. Thereafter, the header separation unit 63 discards the application header, and continuously outputs the data portions to the replacement process unit 31. Through this process, connected data resulting from connecting the divided data is input to the replacement process unit 31. In this example, connected data is data equivalent to data before an application header is inserted. In other words, the header separation unit 63 deletes an application header from the payload of a received packet so as to temporarily restore the data treated as the transmission target in the communication device 10 as the transmission source. An example of generating connected data will be explained by referring to FIG. 12.

The header generation unit 64 operates in the transfer device 60 on the data reception side. When an application header is not included in data restored by the restoration process unit 32, the header generation unit 64 generates information that serves as a replacement for an application header (replacement information). The header generation unit 64 inserts replacement information into restored data, and transfers data after the insertion of the replacement information to the communication device 10 as the destination. Note that replacement information is used as a replacement for an application header in the communication device 10 as the destination of data.

Processes performed in the transmission unit 21, the reception unit 22, the transmission-reception unit 23, the replacement process unit 31, the restoration process unit 32 and the protocol determination unit 42 in the second embodiment are similar to those in the first embodiment. In the second embodiment, information stored in the storage unit 50 as the cache 51, the transmission data table 52, the header information table 54 and the reception data table 55 is also similar to that in the first embodiment.

The hardware configuration of the transfer device 60 of the second embodiment is also as illustrated in FIG. 4. The packet process unit 61 is implemented by the processor 101, and the storage unit 50 is implemented by the memory 102 and the external storage device 104. Also, the transmission unit 21, the reception unit 22 and the transmission-reception unit 23 are implemented by the network connection device 105.

FIG. 11 explains an example of a network to which the second embodiment is applied and an example of the flow information table 65. In the flow information table 65, in association with a combination of a transmission source and a destination of a flow, the application type used for a communication in that flow and the length of data between application headers are stored. In this example, the length of data between application headers is a value determined between the transfer device 60 and the communication device 10 that receives data from that transfer device 60. The header generation unit 64 of the transfer device 60 inserts replacement information for each length of data between application headers, and thereafter transfers the data to the communication device 10. For example, in the example of FIG. 11, the flow having IPA (the communication device 10a) as the transmission source address and IPB (the communication device 10b) as the destination address is performing a communication that uses CIFS, and the interval between pieces of replacement information inserted by the transfer device 60 into data addressed to the communication device 10b is Y1. Also, replacement information to be inserted into data addressed to the communication device 10b is information that serves as a replacement for an application header of CIFS. The flow having IPC (the communication device 10c) as the transmission source address and IPD (the communication device 10d) as the destination address is performing a communication that uses HTTP (Hypertext Transfer Protocol), and the interval between pieces of replacement information inserted by the transfer device 60 into data addressed to the communication device 10d is Y2. Note that replacement information inserted into data addressed to the communication device 10d is information that serves as a replacement for an HTTP header.

Hereinafter, explanations will be given as an example for a case where the transfer device 60a and the transfer device 60b relay data transfer when the communication device 10a transfers data to the communication device 10b as denoted by N1 in FIG. 11.

Figure 12:
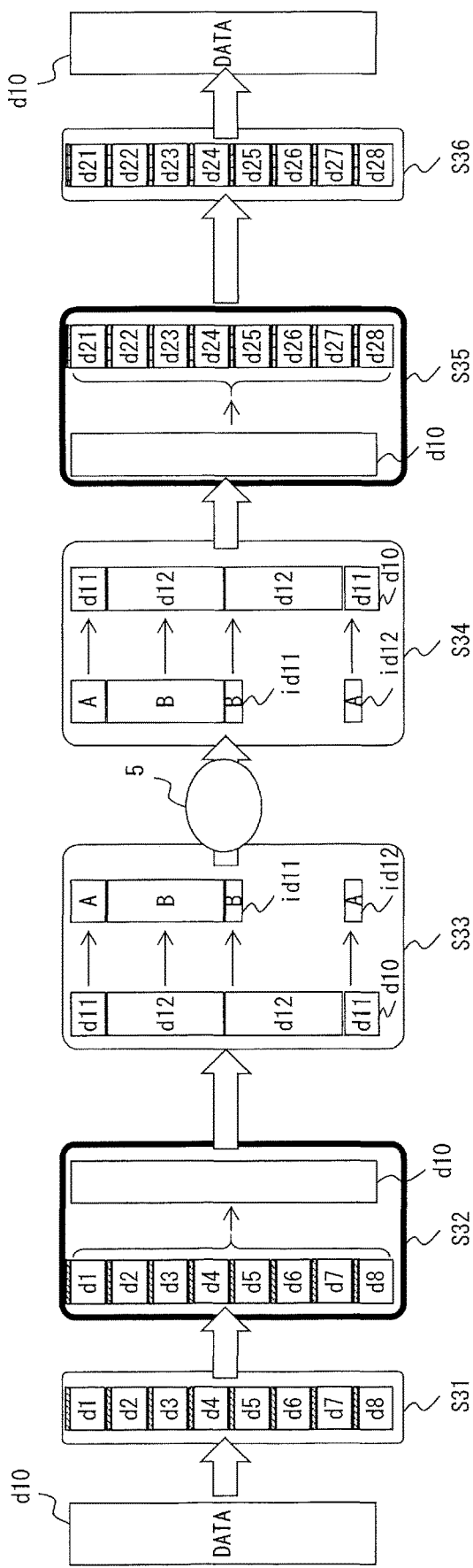
FIG. 12 explains an example of a transfer process according to the second embodiment.

FIG. 12 explains an example of a transfer process according to the second embodiment. Step S31 is an example of a transmission process of data d10 in the communication device 10a, and this process is similar to that explained by referring to step S11 of FIG. 8. In FIG. 12, the rectangles with oblique lines represent application headers.

Step S32 illustrates an example of a process of the header separation unit 63a in the transfer device 60a. The header separation unit 63a obtains the payload of a packet addressed to the communication device 10b via the transmission-reception unit 23a. Accordingly, as illustrated on the left side of step S32, data in which application headers and pieces of data alternate consecutively is input to the header separation unit 63a.

The header separation unit 63a determines each application header by using information of the header information table 54a as appropriate. The method of determining an application header is similar to that in the process in the header separation unit 41 according to the first embodiment. The header separation unit 63a determines the head and end of application header h1, and discards application header h1. Thereafter, divisional data d1 included after application header h1 is read. Further, the header separation unit 63a determines application header h2 included after divisional data d1, and deletes application header h2. As described above, the header separation unit 63a deletes application headers in payloads, and sequentially reads pieces of divisional data. By deleting all of application headers h1 through h8 and continuously reading divisional data d1 through d8, the header separation unit 63a temporarily restores data d10 as illustrated on the right side of step S32. The header separation unit 63a outputs restored data d10 to the replacement process unit 31a.

Step S33 illustrates an example of a deduplication process in the replacement process unit 31a. The right side of step S33 illustrates a situation when data d10 has been input to the replacement process unit 31a. The example of FIG. 12 illustrates a case when data d10 is a combination between data d11 and data d12. Note that neither data d11 nor data d12 is equal to divisional data d1 through d8, and the transfer device 60a determines that neither data d11 nor data d12 has been transmitted with an address to the transfer device 60b before that moment. The replacement process unit 31a transfers, to the transfer device 60b and via the reception unit 22a, data d11 at the head of data d10 in association with identifier id11. Data d12, which follows data d11, is also transferred to the transfer device 60b in association with identifier id12. Further, the replacement process unit 31a adds the following information to the transmission data table 52a.

Identifier associated with data d11: id11
Identifier associated with data d12: id12

Note that the reception data table 55b included in the transfer device 60b also stores identifiers of respective pieces of data in association with data d11 and data d12 accompanying the reception of data.

Next, the replacement process unit 31*a* replaces data d12 included for the second time in the data as the transfer target with identifier id12 according to the transmission data table 52*a*, and transfers the resultant information to the transfer device 60*b*. Similarly, the replacement process unit 31*a* transfers, to the transfer device 60*b*, data resulting from replacing data d11 with identifier id11. Note that to facilitate understanding of the correspondence between pieces of data, information corresponding to data d11 is denoted by A and information corresponding to data d12 is denoted by B in FIG. 12.

Step S34 illustrates an example of a restoration process in the restoration process unit 32*b* of the transfer device 60*b*. Because the restoration process unit 32*b* obtains, via the reception unit 22*b*, a packet transferred from the transfer device 60*a*, data d11, data d12, identifier id11 and identifier id12 are obtained as illustrated on the left side of step S34. The restoration process unit 32*b* uses the reception data table 55*b* to restore data d11 from identifier id11 and to restore data d12 from identifier id12. The right side of step S34 illustrates an example of data obtained through the restoration. Thereby, the restoration process unit 32*b* recognizes that data (data d10) that is consecutive in the order of data d11, data d12, data d12 and data d11 is data addressed to the communication device 10*b*. The restoration process unit 32*b* outputs the data after the restoration to the header generation unit 64*b*. The restoration process unit 32*b* reports, to the header generation unit 64*b*, information of the transmission source and destination of the data as well together with the data.

Step S35 illustrates an example of a process in the header generation unit 64*b*. The header generation unit 64*b* determines whether or not an application header is included in data input from the restoration process unit 32*b*. In the example of FIG. 12, an application header is not included in data d10. Then, the header generation unit 64*b* performs a process for generating replacement information that can be used for a reception process of data d10 in the communication device 10*b* as the destination of the data. First, the header generation unit 64*b* refers to the flow information table 65 by using, as a key, a combination between the transmission source address (IPA) and the destination address (IPB) of the data input from the restoration process unit 32*b*, and determines the type of an application used in the flow.

Further, it is determined whether or not the interval between pieces of replacement information associated with the combination between the transmission source address (IPA) and the destination address (IPB) can also be determined from the flow information table 65*b*. When the interval between pieces of replacement information can be determined from the flow information table 65*b*, the header generation unit 64*b* uses the determined interval. When the flow information table 65*b* does not include the interval between pieces of replacement information in the flow as the process target, the header generation unit 64*b* performs a negotiation process with the communication device 10*b* that is the destination of the flow, and determines the length of data to be included between application headers. Note that the interval between application headers determined in the negotiation between the communication device 10*b* and the transfer device 60*b* is an interval between pieces of replacement information generated by the transfer device 60*b* as a substitution of an application header. The header generation unit 64*b* records the length of data to be included between pieces of replacement information in the flow information table 65*b*. It is assumed in the explanations below that it has been determined that replacement information is to be inserted for each Y1 for data that the transfer device 60*b* transfers to the communication device 10*b*.

When it is possible to determine the type of an application header used by the communication device 10*b* and the length of data to be included between application headers, the header generation unit 64 generates replacement information that will serve as a replacement for an application header. Replacement information is generated in the same format as an application header. The header generation unit 64*b* uses the header information table 54*b* as appropriate when an application header is generated. The header generation unit 64*b* includes the first replacement information before data d10, and includes the second replacement information at the position of Y1 from the head of data d10. Similarly, the header generation unit 64*b* partitions data d10 for each Y1, and includes the resultant data in replacement information. Thus, as illustrated on the left side of step S35, data partitioned at intervals of replacement information is generated. In the example illustrated as step S35, data d10 is partitioned into divisional data d21 through d28 and replacement information is included before each piece of divisional data. The rectangles with oblique lines represent replacement information. Note that while the length of divisional data d21 through d28 is a data length that allows consistency to be achieved in communications between the transfer device 60*b* and the communication device 10*b*, the length is not a data length that was determined with the communication device 10*a* included. Accordingly, divisional data d21 through d28 does not have to be equal to divisional data d1 through d8, and divisional data d21 through d28 may be equal to divisional data d1 through d8. The header generation unit 64*b* outputs the data after the process to the transmission-reception unit 23*b*.

The transmission-reception unit 23*b* transmits, to the communication device 10*b*, data input from the header generation unit 64*b*. Accordingly, information illustrated in step S36 reaches the communication device 10*b*. The communication device 10*b* uses an application and replacement information that were used for the data transfer, and thereby processes divisional data d21 through d28 and replacement information added to the respective pieces of divisional data, in order to obtain data d10.

As described above, in the second embodiment, the transfer device 60 reproduces data d10 that the communication device 10*a*, which serves as a transmission source temporarily, treats as a target to be transmitted to the communication device 10*b*. This can prevent deduplication efficiency from being deteriorated due to a method of generating divisional data in the communication device 10*a* on the transmission side. It is assumed for example that the transfer device 60*a* has transmitted data d11 and data d12 to the transfer device 60*b* but has not transferred divisional data d1 through d8 to the transfer device 60*b*. In such a case, when deduplication is performed on divisional data d1 through d8 as they are, as in the first embodiment, the transfer device 60*a* will transmit divisional data d1 through d8 to the transfer device 60*b*. However, in the second embodiment, deduplication is performed after restoring data d10 that is a transmission target on the basis of divisional data d1 through d8, and thereby it can be determined that data d10 that is a transmission target includes data d11 and data d12 that have already been transmitted. This makes it possible for the transfer device 60 to prevent deduplication efficiency from being lowered due to a change in the size of divisional data generated in the communication device 10 or by other factors.

Note that the process illustrated in FIG. 12 is exemplary, and for example the number of pieces of replacement information used for a transfer process between the transfer device 60b and the communication device 10b etc. may be arbitrarily changed in accordance with implementation. For example, the data length that can follow one application header (replacement information) may be set to be the same length as that of data d10 through a negotiation between the transfer device 60b and the communication device 10b. In such a case, the transfer device 60b may add one piece of replacement information to data d10 and transmit the data to the communication device 10b without dividing data d10.

Figure 13:
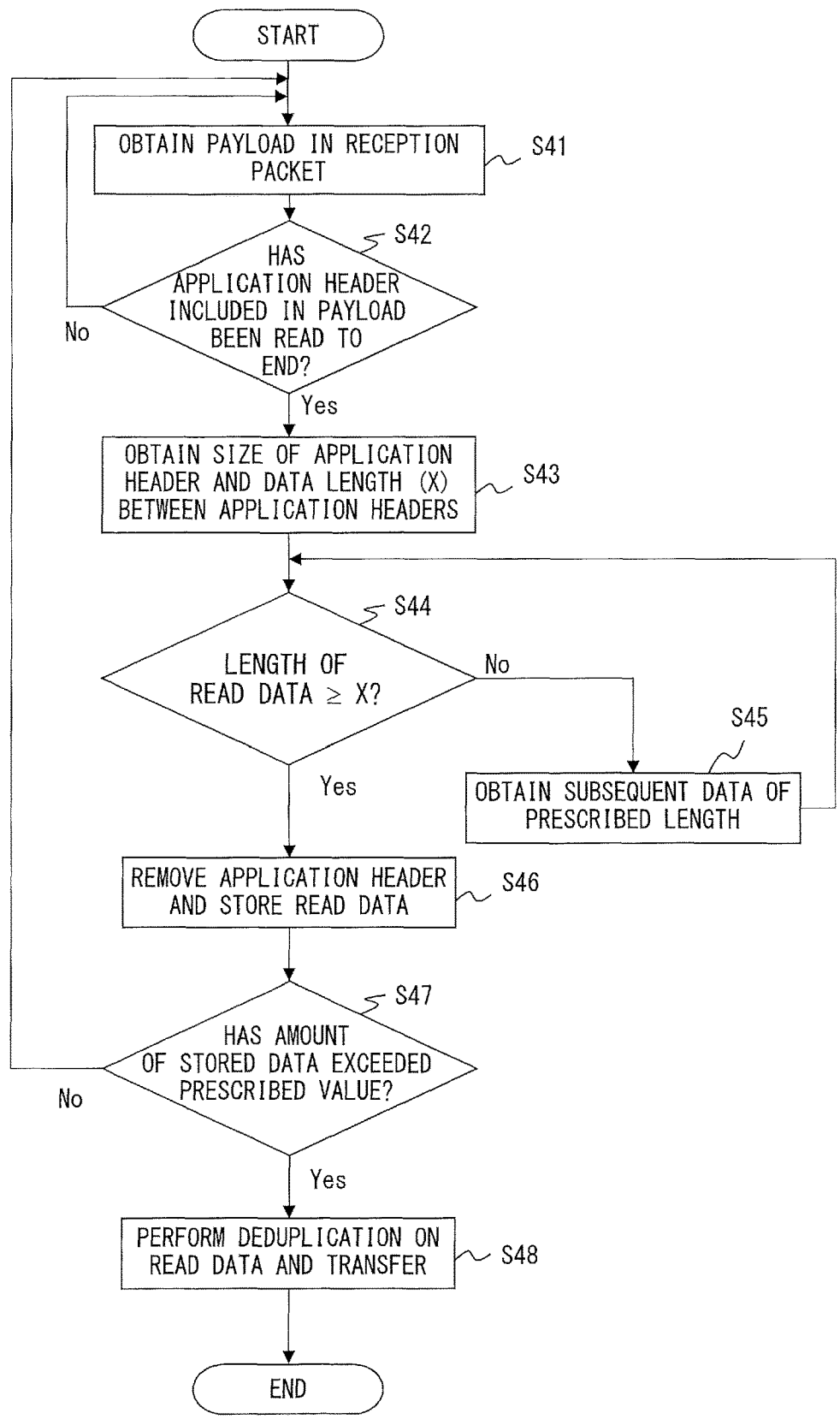
FIG. 13 is a flowchart explaining an example of a process performed in a transfer device on the data transmission side.

FIG. 13 is a flowchart explaining an example of a process performed in the transfer device 60 on the data transmission side. The processes in step S41 through step S45 are similar to those in step S21 through step S25 in FIG. 9. However, the processes in step S42 through step S45 are executed by the header separation unit 63. The header separation unit 63 removes an application header and stores read data in the cache 51 (step S46). The header separation unit 63 determines whether or not the amount of data stored in the cache 51 has exceeded a prescribed value that is set in advance (step S47). When the amount of stored data has not exceeded the prescribed value, the header separation unit 63 repeats the processes in and subsequent to step S41 (NO in step S47). When the amount of stored data exceeds the prescribed value, the header separation unit 63 performs deduplication on read data and transfers the resultant data (step S48). Note that the prescribed value used in step S47 may be a specified value or may be a value that is determined on the basis of the size of a file transferred for each flow etc. When the prescribed value is determined on the basis of the size of a file transferred for each flow etc., the transfer device 60 determines a value as the size of the file in advance and sets the prescribed value on the basis of the determined value. An example of a method of determining a value of the size of a file will be explained by referring to FIG. 16.

Figure 14:
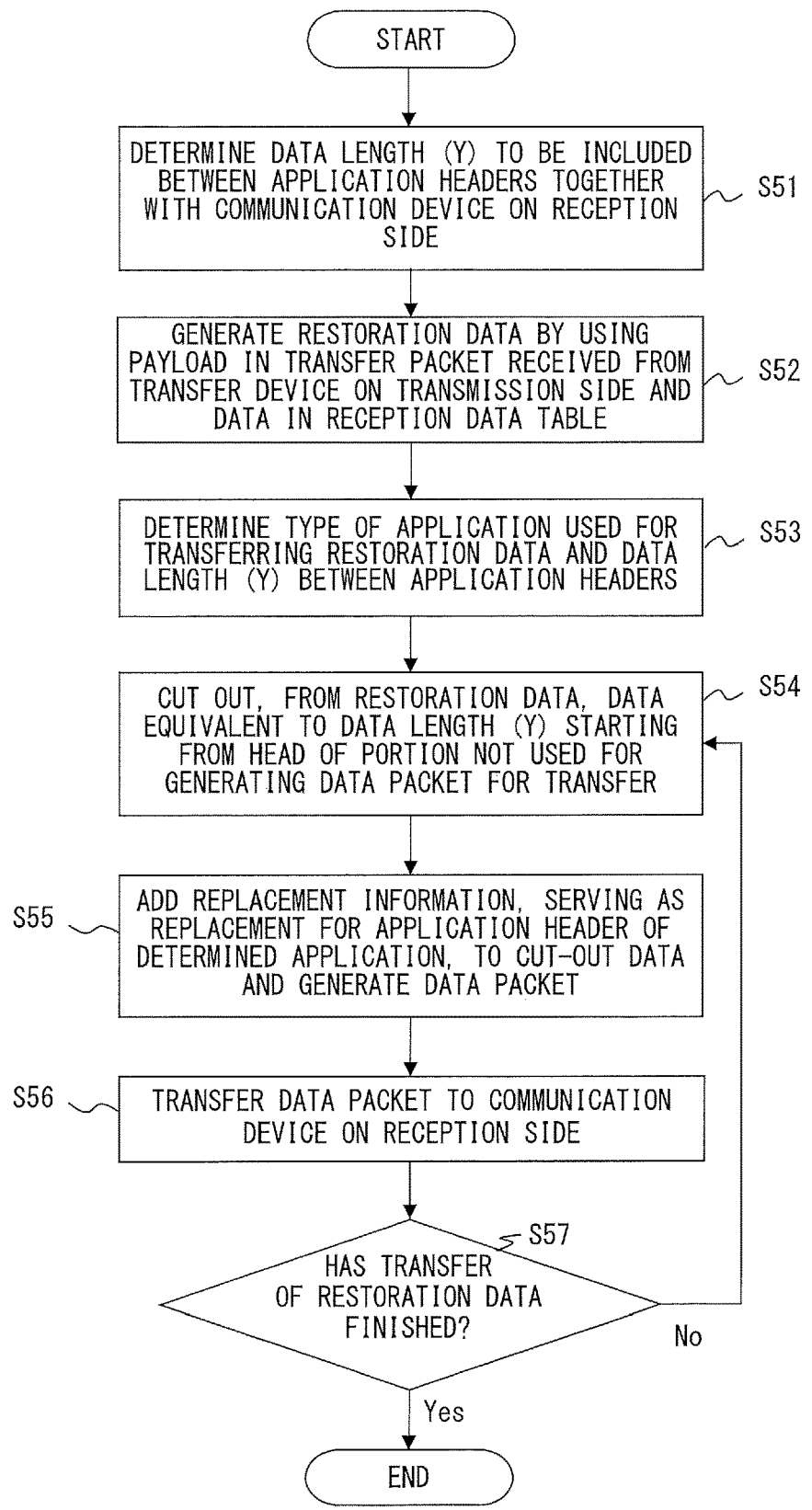
FIG. 14 is a flowchart explaining an example of a process performed in a transfer device on the data reception side.

FIG. 14 is a flowchart explaining an example of a process performed in the transfer device 60 on the data reception side. Note that FIG. 14 illustrates an example of the process, and modifications may be made such as changing the order of step S51 and step S52.

The header generation unit 64 determines data length (Y) to be included between application headers, together with the communication device on the reception side (step S51). The restoration process unit 32 generates restoration data by using the payload of a transfer packet received from the transfer device 60 on the transmission side and data in the reception data table 55 (step S52). The header separation unit 63 determines the type of an application used for transferring the restoration data and the data length between application headers (step S53). The header separation unit 63 cuts out data having data length (Y) starting from the head of a portion not used for generating a data packet for transfer from the restoration data (step S54). The header separation unit 63 adds replacement information, which serves as a replacement for an application header of the determined application, to the cut-out data, and generates a data packet (step S55). The transmission-reception unit 23 transfers the data packet to the communication device 10 on the reception side (step S56). The header separation unit 63 determines whether or not the transfer of the restoration data has finished (step S57). When the transfer of the restoration data has not finished, the header separation unit 63 repeats the processes in and subsequent to step S54.

The transfer device 60 according to the second embodiment removes an application header from data in the payload of the data packet, and thereby temporarily restores data that the communication device 10 as the transmission source is going to transmit to the communication device 10 as the destination. Thereby, in the second embodiment, a deduplication process can be performed in a data size that is greater than that of divisional data generated for inserting an application header in the communication device 10 as the transmission source. In other words, the second embodiment can prevent deduplication efficiency from being deteriorated due to a method of separating application headers and divisional data in a transmission source. Further, an application header is not transmitted or received between the transfer devices 60 in the second embodiment, also leading to an advantage wherein the amount of data transmitted and received between the transfer devices 60 can be reduced in comparison with the first embodiment.

Third Embodiment

Depending upon an application used by the communication device 10, there may be a case where a packet transmitted from the communication device 10 has an order of divisional data that is different from that in the original data. In such a case, an application header will include information representing a position in the original data related to divisional data to which that application header has been added. The sequence number described in FIG. 7 is an example of information representing the position of divisional data. In the communication device 10 on the reception side, the position of data can be determined in accordance with information in an application header, and thus the original data can be received even when the data order has been changed, whereas a change in a data order may deteriorate deduplication efficiency in a transfer device. In view of this, in the third embodiment, an explanation will be given for a case where data that is a transmission target is restored by removing an application header and changing the data order in a case when an application has changed the order in a transfer device.

Figure 15:
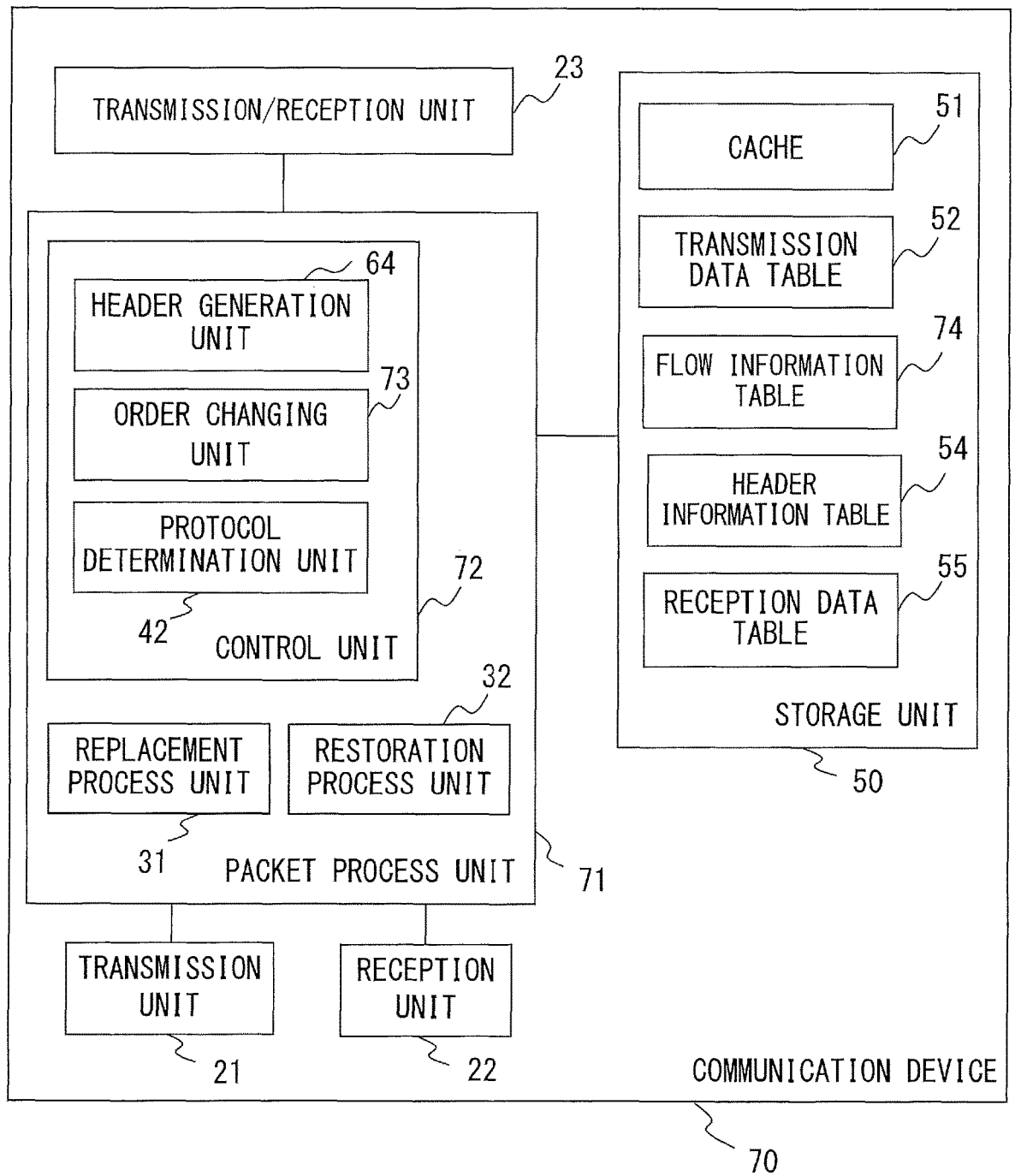
FIG. 15 explains an example of a configuration of a transfer device according to the third embodiment.

FIG. 15 explains an example of a configuration of a transfer device 70 according to the third embodiment. the transfer device 70 includes the transmission unit 21, the reception unit 22, the transmission-reception unit 23, a packet process unit 71 and the storage unit 50. The packet process unit 71 includes the replacement process unit 31, the restoration process unit 32 and a control unit 72. The control unit 72 includes the protocol determination unit 42, an order changing unit 73 and the header generation unit 64. The storage unit 50 stores the cache 51, the transmission data table 52, the header information table 54, the reception data table 55 and a flow information table 74.

The order changing unit 73 operates in the transfer device 70 on the data transmission side. The order changing unit 73 obtains a reception packet via the transmission-reception unit 23 and separates an application header and data included in the payload of the reception packet. The procedures for separating an application header and data are similar to those in the first embodiment. Thereafter, the order changing unit 73 connects data portions in an order specified by an application header and discards the application header. The order changing unit 73 outputs the obtained connected data to the replacement process unit 31. In this example, connected data is data equivalent to data that is a transmission target before an application header is inserted and the order of pieces of divisional data is changed. In other words, the order changing unit 73 rearranges pieces of divisional data extracted from the payload of the reception packet in accordance with an order specified by an application header, and thereby temporarily restores data treated as the transmission target in the communication device 10 as the transmission source. An example of generating connected data will be explained by referring to FIG. 17.

The processes performed in the transmission unit 21, the reception unit 22, the transmission-reception unit 23, the replacement process unit 31, the restoration process unit 32 and the protocol determination unit 42 are similar between the third and first embodiments. Also, processes performed in the header generation unit 64 are similar between the third and second embodiments. In the third embodiment, the information stored in the storage unit 50 as the cache 51, the transmission data table 52, the header information table 54 and the reception data table 55 is also similar to that in the first embodiment.

The hardware configuration of the transfer device 70 according to the third embodiment is also as illustrated in FIG. 4. The packet process unit 71 is implemented by the processor 101, and the storage unit 50 is implemented by the memory 102 and the external storage device 104. Also, the transmission unit 21, the reception unit 22 and the transmission-reception unit 23 are implemented by the network connection device 105.

FIG. 16 illustrates an example of a network to which the third embodiment is applied and an example of the flow information table 74. It is assumed hereinafter and as illustrated in network N2 in FIG. 16 that the transfer device 70a and the transfer device 70b relay data transfer when the communication device 10a transfers data to the communication device 10b. When file transfer starts between the communication device 10a on the data transmission side and the communication device 10b serving as the destination of the data, a negotiation is conducted in order to determine a condition for transmitting and receiving the data. The transfer device 70a and the transfer device 70b also relay a control packet used for the negotiation between the communication device 10a and the communication device 10b, and thus the transfer device 70a and the transfer device 70b receive the control packet used for the negotiation. In the above, when receiving control information used for the negotiation, the transmission-reception unit 23 and the reception unit 22 in each transfer device 70 output the received control packet to the protocol determination unit 42. As appropriate, the protocol determination unit 42 obtains information such as the size of a file that is transmitted and received, the length of data to be included between application headers, etc. from the input control packet. For example, a packet such as SBM2 QUERY_INFO Request etc. may be used when obtaining information such as the size of a file that is transmitted and received etc. When SBM2 QUERY_INFO Request is used, information thereof is obtained from information of a command related to the transmission and reception of a packet. Note that a method of obtaining information such as a file size and the type of a control packet used for obtaining information such as a file size etc. may be arbitrarily changed in accordance with implementation.

The protocol determination unit 42 uses the size of a file to be transmitted and received and the length of data to be included between application headers to obtain the maximum value of the number of sequences of the data to be transmitted and received, and stores the obtained maximum value of the number of sequences in the flow information table 74. For example, the protocol determination unit 42 obtains the maximum sequence number from the following formula, where SNmax represents the maximum number of the number of sequences, FS represents the size of a file that is a transmission target, L represents the length of data to be included between application headers, ceil( ) represents a ceiling function, and SNmin represents the minimum value of the number of sequences.

$$SNmax = ceil(FS/L) + SNmin$$

Figure 17:
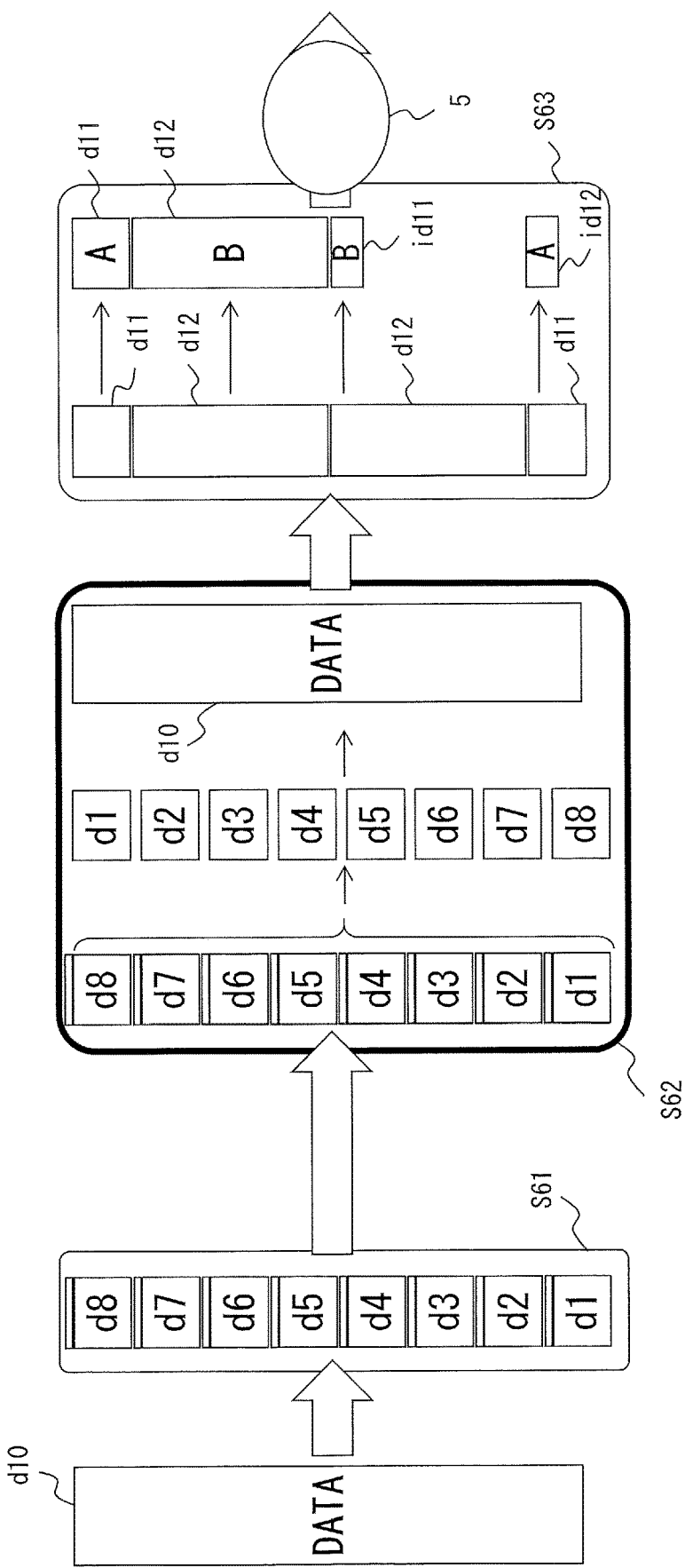
FIG. 17 explains an example of a transfer process according to the third embodiment.

FIG. 17 explains an example of a transfer process according to the third embodiment. Step S61 is an example of a transmission process of data d10 in the communication device 10a. In the example of FIG. 17, the communication device 10a transmits data d10 to the communication device 10b separately in 8 pieces of data, i.e., divisional data d1 through data d8. It is assumed here that the closer to the head of data d10 a piece of data is, the smaller the number in the symbol of that piece of divisional data is. In other words, it is assumed that divisional data d1 includes the head of data d10 and divisional data d8 includes the end of data d10. It is assumed that each application header includes, as the sequence number, the same value as the number portion in the symbol of that application header. For example, divisional data d8 is associated with application header h8, which represents sequence number=8. Also, divisional data d7, divisional data d6, divisional data d5, divisional data d4, divisional data d3 and divisional data d2 are associated with sequence number=7, sequence number=6, sequence number=5, sequence number=4, sequence number=3, and sequence number=2, respectively. Similarly, divisional data d1 is associated with application header h1, which represents sequence number=1. It is assumed that the communication device 10a transmitted, toward the communication device 10b, divisional data together with the corresponding application headers in an order of divisional data d8, d7, d6, d5, d4, d3, d2 and d1.

Step S62 illustrates an example of a process of the order changing unit 73a in the transfer device 70a. The order changing unit 73a obtains the payload of a packet addressed to the communication device 10b via the transmission-reception unit 23a. Accordingly, as illustrated on the left side of step S62, data in which application headers and pieces of divisional data alternate consecutively is input to the order changing unit 73a. Also the divisional data has been transmitted to the transfer device 70a in an order of divisional data d8, d7, d6, d5, d4, d3, d2 and d1.

The order changing unit 73a determines each application header by using information of the header information table 54a as appropriate. The method of determining an application header is similar to the process in the header separation unit 41a in the first embodiment. The order changing unit 73a reads each application header h8 and extracts the sequence number. For example, the order changing unit 73a reads application header h8 and extracts the sequence number included in application header h8. In this example, the sequence number in application header h8 is 8. The order changing unit 73a refers to the flow information table 74a and thereby determines that the data of the last sequence number (SNmax) was received. Then, the order changing unit 73a waits until respective pieces of divisional data from the divisional data associated with the minimum sequence number (SNmin) to the divisional data associated with the last sequence number are received. In the example of step S62, all the pieces have been received from the divisional data associated with the minimum sequence number to the divisional data associated with the last sequence number. Then, the order changing unit 73a rearranges the pieces of divisional data to an order of the sequence numbers associated with these pieces of divisional data, and deletes the application headers. Accordingly, the divisional data is rearranged to the order of divisional data d1, d2, d3, d4, d5, d6, d7 and d8 as illustrated in the middle of step S62. The order changing unit 73a connects the rearranged pieces of divisional data in the order of the original data. Thus, as illustrated on the right side in step S62, the order changing unit 73a restores data that is a transmission target by the communication device 10a on the transmission side to the communication device 10b (data d10). The order changing unit 73a outputs the restored data d10 to the replacement process unit 31a.

Step S63 illustrates an example of deduplication performed in the restoration process unit 32a and an example of a transfer process to the transfer device 70b. The process of step S63 is similar to that explained while referring to step S33 in FIG. 12. The process performed in the transfer device 70b on the reception side is similar to that according to the second embodiment. Thus, the communication device 10b obtains data d10 through the process explained by referring to step S34 through step S36 in FIG. 12.

Note that the process explained by referring to FIG. 17 is exemplary, and the process performed in the transfer device 70 on the transmission side may be changed in accordance with implementation. For example, the order changing unit 73 may output individual pieces of divisional data to the replacement process unit 31 without restoring data d10 resulting from connecting divisional data d1 through d8 in the order of the sequence numbers. In such a case, by the individual pieces of divisional data being input to the replacement process unit 31 in the order of the sequence numbers, data d10 that is a transmission target is reproduced in the replacement process unit 31. Explanations will be given by referring to FIG. 18 for a process in a case when individual pieces of divisional data are output to the replacement process unit 31 in the order of the sequence numbers.

Figure 18:
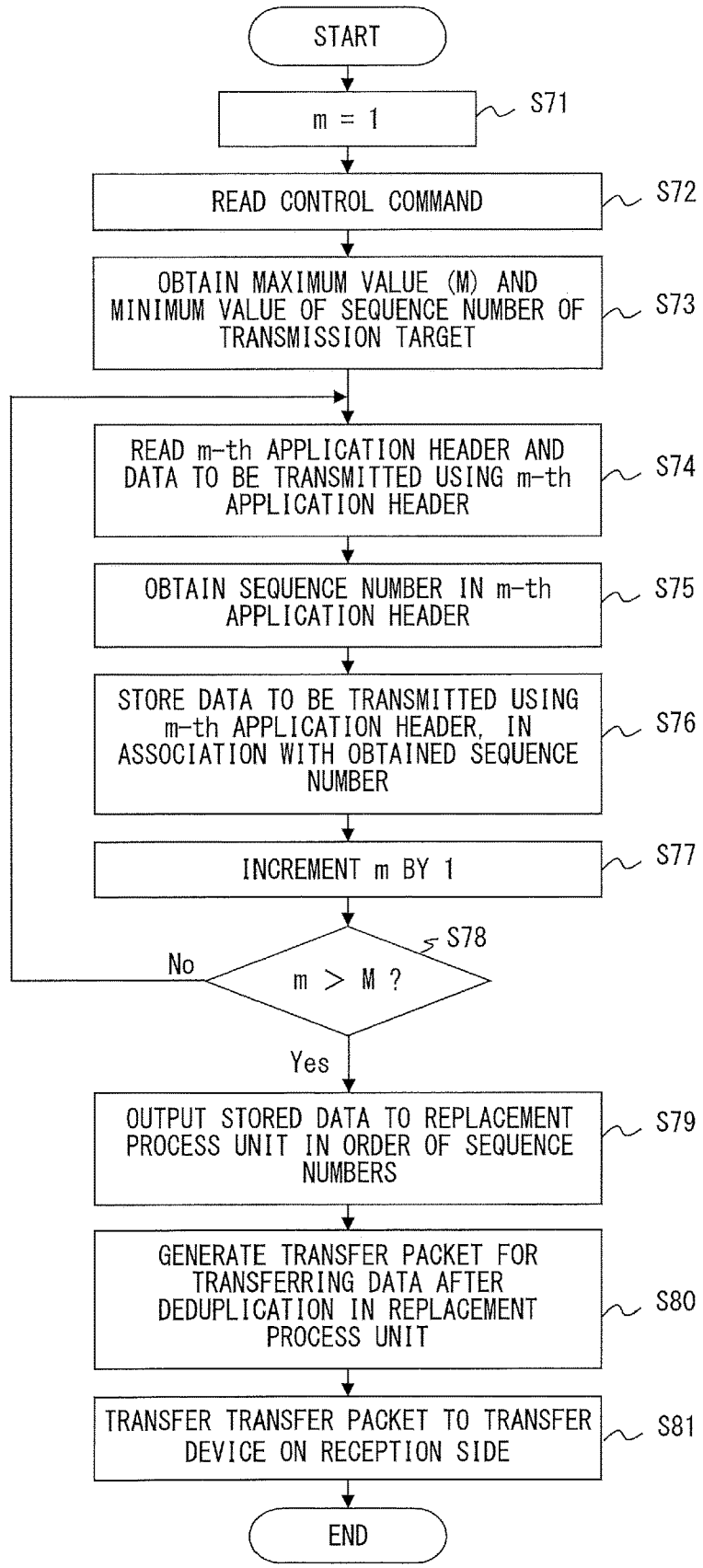
FIG. 18 is a flowchart explaining an example of a process performed in a transfer device according to the third embodiment.

FIG. 18 is a flowchart explaining an example of a process performed in the transfer device 70 according to the third embodiment. FIG. 18 is a flowchart illustrating an example of a process of the transfer device 70 on the transmission side. In FIG. 18, variable m is used for counting the number of application headers on which a process was performed. Constant M is the maximum value of a sequence number added to data transmitted from the communication device 10 as the transmission source in the flow as the process target. Note that the process in FIG. 18 is exemplary, and for example the order of step S71 and step S72 may be changed.

The order changing unit 73 sets variable m to 1 (step S71). The protocol determination unit 42 reads a control command used for a negotiation between the communication device 10 as the transmission source and the communication device 10 as the destination of the flow as the process target, and obtains the maximum value (M) and the minimum value of the sequence number of the transmission target (step S72 and step S73). The order changing unit 73 reads the m-th application header and data to be transmitted using the m-th application header (step S74). The order changing unit 73 obtains the sequence number in the m-th application header (step S75). The order changing unit 73 stores, in the cache 51, data to be transmitted using the m-th application header, in association with the obtained sequence number (step S76). The order changing unit 73 increments variable m by 1 (step S77). The order changing unit 73 determines whether or not variable m has exceeded maximum value M of the sequence number of the transmission target (step S78). When variable m is a value that is equal to or smaller than maximum value M of the sequence number of the transmission target, the processes in and subsequent to step S74 are repeated (NO in step S78). When variable M exceeds maximum value M of the sequence number of the transmission target, the order changing unit 73 outputs data stored in the cache 51 to the replacement process unit 31 in the order of the sequence numbers (YES in step S78, step S79). The replacement process unit 31 performs deduplication, and generates a transfer packet for transferring data after the deduplication (step S80). The replacement process unit 31 transfers the transfer packet to the transfer device 70 on the reception side via the transmission unit 21 (step S81).

Figure 19:
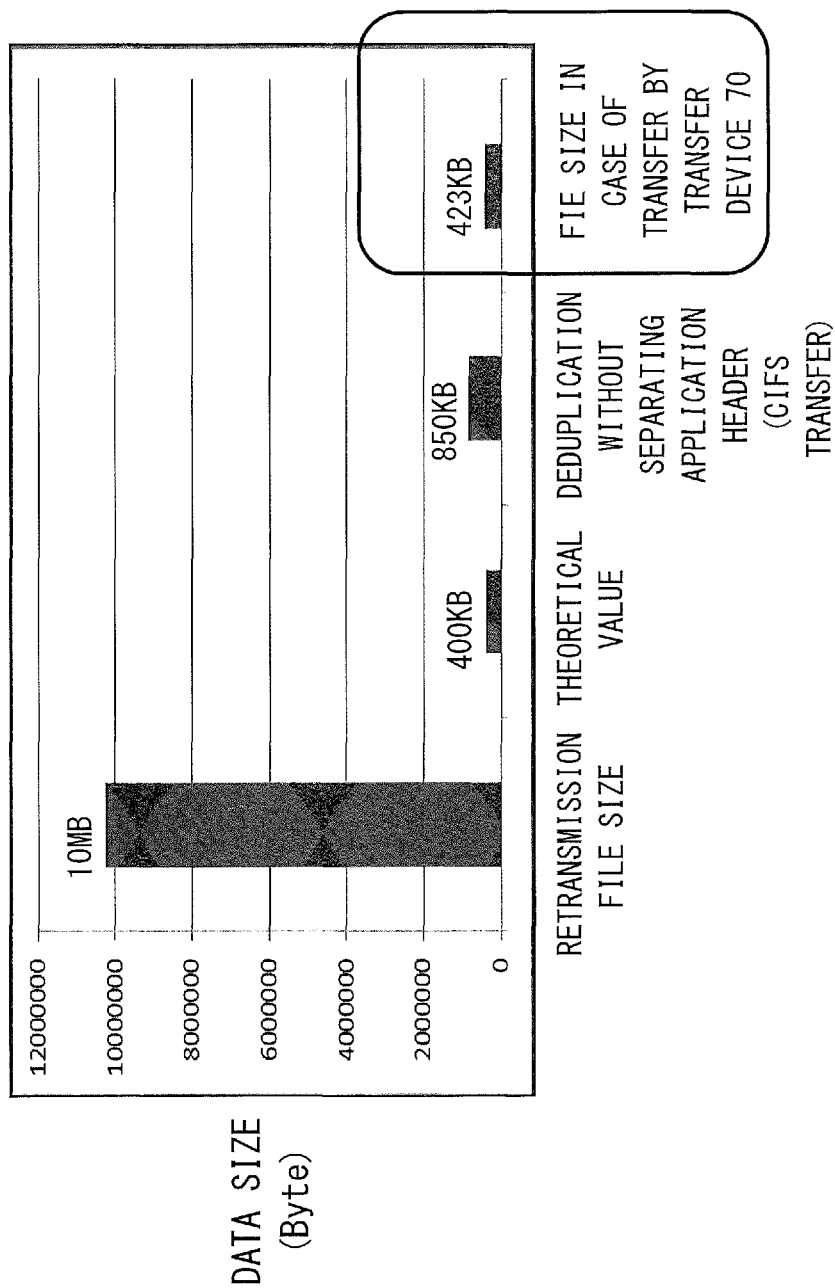
FIG. 19 explains a simulation result of the amount of data that is actually transferred in a transfer process.

FIG. 19 explains a simulation result of the amount of data that is actually transferred in a transfer process. FIG. 19 illustrates the amount of data transferred between deduplication devices when the communication device 10a retransmits a file to the communication device 10b via two determination devices. It is assumed that the size of the file that the communication device 10a is going to retransmit to the communication device 10b (retransmission file) is 10 megabytes. Note that a retransmission file is a file that the communication device 10a has already transmitted to the communication device 10b via a deduplication device and that is to be retransmitted from the communication device 10a to the communication device 10b.

When deduplication has been performed completely in a case when the communication device 10a retransmits a retransmission file to the communication device 10b, data of 400 kilobytes is transmitted and received between the deduplication devices as expressed as the theoretical value in FIG. 19. When deduplication has been performed without distinguishing an application header from a data portion in a case when a retransmission file is retransmitted from the communication device 10a to the communication device 10b by using CIFS, data of 850 kilobytes is to be transmitted and received between the deduplication devices. In other words, as a result of performing deduplication without distinguishing a file retransmitted by using CIFS and an application header of CIFS, deduplication efficiency deteriorates and 2.1 times as much data as the theoretical value or more data will be transmitted and received between the deduplication devices.

Meanwhile, as illustrated in the rightmost portion in FIG. 19, the amount of data transmitted and received between the transfer device 70a and the transfer device 70b is 423 kilobytes in a case when the transfer device 70a and the transfer device 70b relay a communication between the communication device 10a and the communication device 10b. Accordingly, the amount of data transmitted and received between the transfer devices 70 is almost equal to the theoretical value. Also, the amount of data transmitted and received between the transfer devices 70 is reduced to half of, or less than half of, the amount of the duplication process in a case when the existence of an application header and a change of an order of data are not taken into consideration.

As described above, in the third embodiment, an application header and data that is a transmission target are separated, a change in the order of data made by an application is modified and the data as the transmission target is reproduced temporarily, and thereby deterioration in deduplication efficiency can be prevented effectively.

Further, the third embodiment also achieves an advantage that even when a gap has temporarily occurred between transmission packets from the communication device 10a, deduplication efficiency does not deteriorate. It is assumed for example that in the process illustrated in FIG. 17, the transmission of data from the communication device 10a has been interrupted, by a process in the communication device 10a on the transmission side, a communication circumstance etc. in the path between the communication device 10a and the transfer device 70a on the transmission side or by other factors, after data up to divisional data d8 through d6 have been transmitted to the transfer device 70a. In such a case, the order changing unit 73a in the transfer device 70a has recognized the scope of the sequence numbers of divisional data transmitted from the communication device 10a, and thus can determine that not all pieces of data have reached the transfer device 70a and wait for the arrival of the other pieces of divisional data.

It is assumed here that it is not recognized that data d12 that has already been transferred is included in the transmission data even when divisional data d8 through d6 are used. A device not including the order changing unit 73a does not predict whether or not other divisional data will arrive, and accordingly performs deduplication on data that has arrived. This leads to a situation where it is not recognized that data d12 is included in the transmission target because partial data has not arrived and data that is part of data d12 is transferred in a form of data, causing deterioration in deduplication efficiency.

On the contrary, the transfer device 70 uses the sequence numbers added to data transmitted from the communication device 10a and waits for divisional data that has not arrived, and thereby can determine that transmission data includes data d11 and data d12 so as to convert both of data d11 and data d12 into identifiers and perform transfer. Accordingly, in the transfer device 70, even a gap is included in transfer of data, deterioration in deduplication efficiency due to that gap can be prevented.

<Others>

Note that the embodiments are not limited to the above and allows various modifications. Hereinafter, some examples thereof will be described.

In the explanations above, cases where transfer processes using CIFS are performed have been explained in detail as specific examples, however an application used for transfer may be an arbitrary protocol or application that is not CIFS in the method according to each embodiment. For example, the transfer process according to each embodiment may be applied also to a transfer process that uses an arbitrary protocol including HTTP and FTP (File Transfer Protocol).

The information elements in tables, formats of packets, etc. used in the above explanations are exemplary, and can arbitrarily changed in accordance with implementation. Also, information such as a sequence number, a data length, etc. in an application header may be stored in a dedicated field or may be stored as part of information such as a command etc. in an application header.

An exemplary case has been explained where a program used for the operations of the transfer devices 20, 60 and 70 is stored in the external storage device 104 in the above explanations, however programs may be stored in an arbitrary storage medium. When the transfer devices 20, 60 and 70 are implemented as a computer, the computer operates as a transfer device by reading a program recorded in a storage medium.

As described above, the embodiments can improve the efficiency in data transfer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transfer device comprising:
   a network connection device configured to receive a packet transmitted from a communication device with an address to a destination device and to transmit the packet to the destination device; and
   a processor configured to execute a process including
      separating received data included in the packet into a plurality of pieces of transmission data and control information generated, for each of the pieces of the transmission data, by a communication application that performs a transmission process in the communication device,
      generating connected data by connecting the plurality of pieces of the transmission data in an order starting from a piece of the transmission data closest to a head of the packet, and
      generating, when the connected data includes first data associated with a first identifier, replacement data resulting from replacing the first data of the connected data by the first identifier,
      wherein the network connection device transfers the replacement data toward the destination device, and
      wherein the first data is included in a previously received packet that the network connection device transmitted to the destination device in association with the first identifier.

2. The transfer device according to claim 1, wherein the processor
   determines first transmission data, located between an end of first control information in the received data received through the packet and a starting position of second control information that is inserted next to the first control information,
   separates the first control information, the first transmission data and the second control information from each other, and processes the first transmission data separately from the first control information and the second control information.

3. The transfer device according to claim 1,
   further comprising a storage configured to store reception data, received from a different transfer device, and a reporting identifier, received from the different transfer device and identifying the reception data, in association with each other,
   wherein the processor is further configured to restore the reporting identifier included in different data addressed to the communication device to the reception data identified by the reporting identifier when receiving the different data addressed to the communication device from the different transfer device,
   wherein the network connection device transmits restored data, obtained by restoration of the reporting identifier, to the communication device.

4. The transfer device according to claim 3,
   wherein the processor
      determines, when receiving the different data addressed to the communication device from the different transfer device, whether the different data addressed to the communication device includes control data used by a control application in the communication device for control, and inserts replacement information, as a replacement for the control data, into incomplete data addressed to the communication device when the incomplete data does not include the control data, and wherein the network connection device transmits, to the communication device, augmented data into which the replacement information has been inserted.

5. A communication system comprising:

a communication device;

a destination device, which is a communication destination of the communication device; and first and second transfer nodes that relay a communication between the communication device and the destination device, the first transfer node having at least a first processor configured to separate, when receiving a packet addressed to the destination device from the communication device, received data in the packet into a plurality of pieces of transmission data and control information generated, for each of the pieces of the transmission data, by a communication application that performs a transmission process in the communication device, generate connected data by connecting the plurality of pieces of the transmission data in an order starting from a piece of the transmission data closest to a head of the packet, generate, when the connected data includes first data associated with a first identifier, replacement data resulting from replacing the first data of the connected data by the first identifier, the first data having been obtained from a previously received packet transmitted to the destination device in association with the first identifier, and initiate transmission of the replacement data to the second transfer node, and the second transfer node having at least a second processor configured to restore the connected data by using the replacement data received from the first transfer node, and transmit the control information, controlling a process in the destination device, and the connected data to the destination device.

6. The communication system according to claim 5, wherein the at least one first processor determines first transmission data, located between an end of first control information in the received data through the packet and a starting position of second control information that is inserted next to the first control information, separates the first control information, the first transmission data and the second control information from each other, and processes the first transmission data separately from the first control information and the second control information.

7. A communication method in a network in which a communication between a communication device and a destination device, which is a communication destination of the communication device, is relayed by first and second transfer nodes, comprising separating, by the first transfer node when receiving a packet addressed to the destination device from the communication device, received data in the packet into transmission data and control information generated, for each of the pieces of the transmission data, by a communication application that performs a transmission process in the communication device;

generating connected data by the first transfer node connecting the plurality of pieces of the transmission data in an order starting from a piece of the transmission data closest to a head of the packet;

generating, by the first transfer node when the connected data includes first data associated with a first identifier, replacement data resulting from replacing the first data of the connected data by the first identifier, the first data having been obtained from a previously received packet transmitted to the destination device in association with the first identifier;

transmitting the replacement data to the second transfer the second transfer device node;

restoring, by the second transfer node, the connected data by using the replacement data received from the first transfer node; and transmitting the control information, controlling a process in the destination device, and the connected data to the destination device.

8. The communication method according to claim 7, further comprising"

determining, by the first transfer device, first transmission data, located between an end of first control information in the received data in the packet and a starting position of second control information that is inserted next to the first control information;

separating the first control information, the first transmission data and the second control information from each other; and processing the first transmission data separately from the first control information and the second control information.

* * * * *